(12) United States Patent
Das et al.

(10) Patent No.: US 12,346,440 B2
(45) Date of Patent: *Jul. 1, 2025

(54) AUTONOMOUS MACHINE LEARNING METHODS FOR DETECTING AND THWARTING RANSOMWARE ATTACKS

(71) Applicant: Sotero, Inc., Burlington, MA (US)

(72) Inventors: Purandar Gururaj Das, Lexington, MA (US); Shanthi Boppana, Boxborough, MA (US)

(73) Assignee: Sotero, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,602

(22) Filed: May 22, 2024

(65) Prior Publication Data

US 2024/0311477 A1    Sep. 19, 2024

Related U.S. Application Data

(63) Continuation of application No. 18/466,986, filed on Sep. 14, 2023, now Pat. No. 12,032,694.
(Continued)

(51) Int. Cl.
G06F 21/55    (2013.01)
G06F 21/56    (2013.01)
G06F 21/60    (2013.01)

(52) U.S. Cl.
CPC .......... G06F 21/564 (2013.01); G06F 21/552 (2013.01); G06F 21/604 (2013.01)

(58) Field of Classification Search
CPC .... G06F 21/564; G06F 21/552; G06F 21/604; G06F 21/554; G06F 21/56; H04L 63/1416; H04L 63/1441; H04L 41/16
See application file for complete search history.

(56) References Cited

U.S. PATENT DOCUMENTS 7,783,899 B2    8/2010    Golle et al.
7,783,900 B2    8/2010    Hacigumus et al.
(Continued)

FOREIGN PATENT DOCUMENTS

EP              2400424 B1      4/2016
WO      WO-2021178609 A1      9/2021
(Continued)

OTHER PUBLICATIONS

Anomaly Detection on Time-Evolving Streams in Real-time. Detecting intrusions (DoS and Ddos attachks), frauds, fake rating anomalies, retrieved on Aug. 8, 2022 at https://github.com/Stream-AD/Mstream (4 total pages).
(Continued)

*Primary Examiner* — Ali S Abyaneh
(74) *Attorney, Agent, or Firm* — COOLEY LLP

(57) ABSTRACT

A non-transitory, processor-readable medium storing instructions that, when executed by a processor, cause the processor to receive, from a requestor compute device, a first request that references one of an electronic file or a data set stored in a memory. The processor monitors a plurality of subsequent requests originating from the requestor compute device. The instructions cause the processor to identify, based on the monitoring of the plurality of subsequent requests, a detected ransomware type from a plurality of ransomware types. Each ransomware type is associated with a predefined sequence of actions associated with the one of the electronic file or the data set. In response to identifying the detected ransomware type, the processor either generates an alert message that includes an indication of an association between the requestor compute device and the detected ransomware type; or modifies an access control permission associated with the requestor compute device.

20 Claims, 11 Drawing Sheets

Related U.S. Application Data

(60) Provisional application No. 63/406,288, filed on Sep. 14, 2022.

(56) References Cited

U.S. PATENT DOCUMENTS

| | | | |
|---|---|---|---|
| 7,890,774 | B2 | 2/2011 | Agrawal et al. |
| 8,429,421 | B2 | 4/2013 | Chase et al. |
| 9,047,480 | B2 | 6/2015 | Kahol et al. |
| 9,275,249 | B1 | 3/2016 | Allen |
| 9,712,495 | B2 | 7/2017 | Nagpal et al. |
| 9,805,090 | B1 | 10/2017 | Martino et al. |
| 9,875,370 | B2 | 1/2018 | Antonopoulos et al. |
| 9,888,032 | B2 * | 2/2018 | Dekel ................. G06F 21/60 |
| 9,990,511 | B1 * | 6/2018 | Dreyfus ................ G06F 3/0619 |
| 10,013,574 | B2 | 7/2018 | Hore |
| 10,027,486 | B2 | 7/2018 | Liu |
| 10,255,454 | B2 | 4/2019 | Kamara et al. |
| 10,496,638 | B2 | 12/2019 | Wang et al. |
| 10,528,556 | B1 | 1/2020 | Chmil et al. |
| 10,581,812 | B2 | 3/2020 | Rohloff et al. |
| 10,609,066 | B1 * | 3/2020 | Nossik ............... H04L 63/1408 |
| 10,628,587 | B2 | 4/2020 | Stepanek et al. |
| 10,789,374 | B2 | 9/2020 | Fujiwara et al. |
| 10,885,158 | B2 | 1/2021 | Goldwasser et al. |
| 10,984,052 | B2 | 4/2021 | Dong et al. |
| 11,025,598 | B1 | 6/2021 | Laghaeian et al. |
| 11,038,672 | B2 | 6/2021 | Shainski et al. |
| 11,170,104 | B1 | 11/2021 | Stickle et al. |
| 11,184,149 | B2 | 11/2021 | Chakraborty et al. |
| 11,222,134 | B2 | 1/2022 | Das et al. |
| 11,501,013 | B1 | 11/2022 | Das et al. |
| 12,032,694 | B2 | 7/2024 | Das et al. |
| 2002/0069355 | A1 | 6/2002 | Garrison |
| 2003/0101355 | A1 * | 5/2003 | Mattsson ............ G06F 21/554 726/23 |
| 2004/0193905 | A1 | 9/2004 | Lirov et al. |
| 2007/0195960 | A1 | 8/2007 | Goldman et al. |
| 2012/0042386 | A1 | 2/2012 | Backer |
| 2013/0191650 | A1 | 7/2013 | Balakrishnan et al. |
| 2014/0281512 | A1 | 9/2014 | Arasu et al. |
| 2014/0325217 | A1 | 10/2014 | Mori et al. |
| 2017/0063888 | A1 | 3/2017 | Muddu et al. |
| 2017/0289191 | A1 | 10/2017 | Thioux et al. |
| 2017/0329966 | A1 * | 11/2017 | Koganti ................. G06F 21/56 |
| 2017/0366568 | A1 | 12/2017 | Narasimhan et al. |
| 2018/0248896 | A1 | 8/2018 | Challita et al. |
| 2018/0293379 | A1 * | 10/2018 | Dahan ................... G06F 21/568 |
| 2019/0102553 | A1 | 4/2019 | Herwadkar et al. |
| 2019/0108255 | A1 | 4/2019 | Tabak et al. |
| 2019/0109870 | A1 | 4/2019 | Bedhapudi et al. |
| 2019/0147170 | A1 | 5/2019 | Keselman et al. |
| 2019/0258817 | A1 | 8/2019 | Beier et al. |
| 2019/0303575 | A1 | 10/2019 | Chelarescu et al. |
| 2020/0036512 | A1 | 1/2020 | Vaikuntanathan et al. |
| 2020/0067975 | A1 | 2/2020 | Ojha et al. |
| 2020/0084236 | A1 | 3/2020 | Kallos et al. |
| 2020/0151356 | A1 | 5/2020 | Rohloff et al. |
| 2020/0159624 | A1 | 5/2020 | Malkov et al. |
| 2020/0228308 | A1 | 7/2020 | Shainski et al. |
| 2020/0244672 | A1 * | 7/2020 | Grill ................... H04L 63/1433 |
| 2020/0287936 | A1 | 9/2020 | Nguyen |
| 2020/0329066 | A1 | 10/2020 | Kirti et al. |
| 2020/0336502 | A1 | 10/2020 | Xu et al. |
| 2020/0358799 | A1 | 11/2020 | Boyer et al. |
| 2021/0004373 | A1 | 1/2021 | Sankaran et al. |
| 2021/0006589 | A1 | 1/2021 | Kohout et al. |
| 2021/0019403 | A1 | 1/2021 | Mehta et al. |
| 2021/0044603 | A1 | 2/2021 | Annen et al. |
| 2021/0117232 | A1 | 4/2021 | Sriharsha et al. |
| 2021/0157932 | A1 | 5/2021 | Blatt et al. |
| 2021/0160048 | A1 | 5/2021 | Blatt et al. |
| 2021/0273958 | A1 | 9/2021 | Mclean |
| 2022/0207172 | A1 | 6/2022 | Das et al. |
| 2023/0033716 | A1 | 2/2023 | Das et al. |
| 2024/0086532 | A1 | 3/2024 | Das et al. |

FOREIGN PATENT DOCUMENTS

| | | |
|---|---|---|
| WO | WO-2022114689 A1 | 6/2022 |
| WO | WO-2023283423 A1 | 1/2023 |
| WO | WO-2024059676 A1 | 3/2024 |

OTHER PUBLICATIONS

Bhatia, S., et al., "MSTREAM: Fast Anomaly Detection in Multi-Apsect Streams," WWW '21: Proceedings of the Web Conference, Apr. 19-23, 2021, https://doi.org/10.1145/3442381.3450023 (12 total pages).

Chen, L., et al., "Towards resilient machine learning for ransomware detection," May 16, 2019, https://arxiv.org/pdf/1812.09400.pdf, 10 pages.

Co-pending U.S. Appl. No. 18/758,874, filed Jun. 28, 2024.

Curino, C. et al. "Relational Cloud: A Database-as-a-Service for the Cloud." 5th Biennial Conference on Innovative Data Systems Research, CIDR 2011, Jan. 9-12, 2011 Asilomar, California (7 total pages).

Fernando, D. W., et al., "A Study on the Evolution of Ransomware Detection Using Machine Learning and Deep Learning Techniques," IoT 2020, 1, 551-604, published Dec. 15, 2020, doi:10.3390/iot1020030.

Final Office Action for U.S. Appl. No. 17/571,744 dated Jan. 2, 2024, 16 pages.

Final Office Action for U.S. Appl. No. 17/965,387 mailed Jul. 1, 2024, 13 pages.

International Preliminary Report on Patentability for International Application No. PCT/US2021/020779, mailed on Sep. 15, 2022, 11 pages.

International Preliminary Report on Patentability, mailed Jan. 18, 2024, for International Application No. PCT/US2022/036501, 7 total pages.

International Search Report and Written Opinion for International Application No. PCT/US2022/036501, mailed Oct. 17, 2022, 13 pages.

International Search Report and Written Opinion for PCT Application No. PCT/US2023/074132 dated Jan. 2, 2024, 11 pages.

International Search Report and Written Opinion issued for International Application No. PCT/US2021/020779, mailed on May 3, 2021, 17 pages.

Non-Final Office Action for U.S. Appl. No. 17/571,744 dated Aug. 16, 2023, 16 pages.

Non-Final Office Action for U.S. Appl. No. 17/965,387 dated Mar. 14, 2024, 11 pages.

Non-Final Office Action for U.S. Appl. No. 18/466,986 dated Nov. 6, 2023, 16 pages.

Non-Final Office Action, mailed May 14, 2021, for U.S. Appl. No. 17/191,177, 11 pages.

Notice of Allowance, dated Sep. 28, 2022, for U.S. Appl. No. 17/860,196, 13 pages.

Notice of Allowance for U.S. Appl. No. 17/571,744 dated Apr. 26, 2024, 14 pages.

Notice of Allowance for U.S. Appl. No. 18/466,986 dated Feb. 27, 2024, 12 pages.

Notice of Allowance, mailed Aug. 31, 2021, for U.S. Appl. No. 17/191,177, 16 pages.

Popa, et al., "CryptDB: Protecting Confidentiality with Encrypted Query Processing," SOSP '11, (Oct. 23-26, 2011), pp. 85-100.

Wen et al., "PaRQ: A Privacy-Preserving Range Query Scheme Over Encrypted Metering Data for Smart Grid,", IEEE, vol. 1, No. 1, Jun. 2013, pp. 178-191, published Jul. 23, 2013, doi: 10.1109/TETC.2013.2273889.

Yang et al., "Privacy-Preserving Queries on Encrypted Data," https://www.semanticscholar.org/paper/Privacy-Preserving-Queries-on-Encrypted-Data-Yang-Zhong/684b24117bfa7a93010d386425faa917d9cf3e61 (2006), 17 pages.

* cited by examiner

| Time | sotero.file.action | sotero.file.remote_host | sotero.file.proxy_host | sotero.file.file_path | sotero.file.length | sotero.ransomware_score | sotero.anomaly | fields.log_type | sotero.file.user_id |
|---|---|---|---|---|---|---|---|---|---|
| Jul 13, 2022 @ 23:22:51.047 | WRITE | 35.203.138.188 | file-gateway1.dev.soterosoft.com | ransomwaretest\jay\1000F iles\Type1\text1 copy 101 - Copy.txt.p0w3r | 32,796 | 0.984 | - | file | admin |
| Jul 13, 2022 @ 23:22:51.046 | CREATE | 35.203.138.188 | file-gateway1.dev.soterosoft.com | ransomwaretest\jay\1000F iles\Type1\text1 copy 101 - Copy.txt.p0w3r | 1 | - | true | file | admin |
| Jul 13, 2022 @ 23:22:50.445 | DELETE | 35.203.138.188 | file-gateway1.dev.soterosoft.com | ransomwaretest\jay\1000F iles\Type1\text1 copy 101 - Copy.txt | 1 | - | true | file | admin |
| Jul 13, 2022 @ 23:22:50.445 | CREATE | 35.203.138.188 | file-gateway1.dev.soterosoft.com | ransomwaretest\jay\1000F iles\Type1\text1 copy 101 - Copy.txt | 1 | 0 | - | file | admin |
| Jul 13, 2022 @ 23:22:49.831 | READ | 35.203.138.188 | file-gateway1.dev.soterosoft.com | ransomwaretest\jay\1000F iles\Type1\text1 copy 101 - Copy.txt | 32,768 | - | true | file | admin |

| Time | sotero.file.action | sotero.file.remote_host | sotero.file.proxy_host | sotero.file.file_path |
|---|---|---|---|---|
| Jul 13, 2022 @ 23:22:51.047 | WRITE | 35.203.138.188 | file-gateway1.dev.soterosoft.com | ransomwaretest\jay\1000F iles\Type1\text1 copy 101 - Copy.txt.p0w3r |
| Jul 13, 2022 @ 23:22:51.046 | CREATE | 35.203.138.188 | file-gateway1.dev.soterosoft.com | ransomwaretest\jay\1000F iles\Type1\text1 copy 101 - Copy.txt.p0w3r |
| Jul 13, 2022 @ 23:22:50.445 | DELETE | 35.203.138.188 | file-gateway1.dev.soterosoft.com | ransomwaretest\jay\1000F iles\Type1\text1 copy 101 - Copy.txt |
| Jul 13, 2022 @ 23:22:50.445 | CREATE | 35.203.138.188 | file-gateway1.dev.soterosoft.com | ransomwaretest\jay\1000F iles\Type1\text1 copy 101 - Copy.txt |
| Jul 13, 2022 @ 23:22:49.831 | READ | 35.203.138.188 | file-gateway1.dev.soterosoft.com | ransomwaretest\jay\1000F iles\Type1\text1 copy 101 - Copy.txt |

FIG. 9A

| Time ▼ | sotero.file.action | sotero.file.remote_host | sotero.file.proxy_host | sotero.file.file_path | sotero.file.length | sotero.ransomware_score | sotero.anomaly | fields.log_type | sotero.file.user_id |
|---|---|---|---|---|---|---|---|---|---|
| > Jul 13, 2022 @ 23:22:51.047 | WRITE | 35.203.138.186 | file-gateway1.dev.soterosoft.com | ransomwaretest/jay1000F ilesType1/text1 copy 101 - Copy.txt.p0w3r | 32,796 | 0.984 | | file | admin |
| > Jul 13, 2022 @ 23:22:51.046 | CREATE | 35.203.138.186 | file-gateway1.dev.soterosoft.com | ransomwaretest/jay1000F ilesType1/text1 copy 101 - Copy.txt.p0w3r | 1 | 1 | true | file | admin |
| > Jul 13, 2022 @ 23:22:50.445 | DELETE | 35.203.138.186 | file-gateway1.dev.soterosoft.com | ransomwaretest/jay1000F ilesType1/text1 copy 101 - Copy.txt | 1 | 1 | true | file | admin |
| > Jul 13, 2022 @ 23:22:50.445 | CREATE | 35.203.138.186 | file-gateway1.dev.soterosoft.com | ransomwaretest/jay1000F ilesType1/text1 copy 101 - Copy.txt | 1 | 0 | | file | admin |
| > Jul 13, 2022 @ 23:22:49.831 | READ | 35.203.138.188 | file-gateway1.dev.soterosoft.com | ransomwaretest/jay1000F ilesType1/text1 copy 101 - Copy.txt | 32,768 | 1 | true | file | admin |

1-50 of 2560

| sotero.file.length | sotero.ransomware_score | sotero.anomaly | fields.log_type | sotero.file.user_id |
|---|---|---|---|---|
| 32,796 | 0.984 | | file | admin |
| 1 | 1 | true | file | admin |
| 1 | 1 | true | file | admin |
| 1 | 0 | | file | admin |
| 32,768 | 1 | true | file | admin |

FIG. 9B

AUTONOMOUS MACHINE LEARNING METHODS FOR DETECTING AND THWARTING RANSOMWARE ATTACKS

CROSS-REFERENCE TO RELATED APPLICATIONS

This application is a continuation application of U.S. patent application Ser. No. 18/466,986, titled "Autonomous Machine Learning Methods for Detecting and Thwarting Ransomware Attacks" and filed Sep. 14, 2023, which claims priority to and benefit of U.S. Provisional Patent Application No. 63/406,288, titled "Autonomous Machine Learning Methods for Detecting and Thwarting Ransomware Attacks" and filed Sep. 14, 2022, the entire disclosure of each of which are incorporated by reference herein in their entireties.

This application is related to U.S. Pat. No. 11,222,134, issued Jan. 11, 2022 and titled "System and Methods for Data Encryption and Application-Agnostic Querying of Encrypted Data," and is related to U.S. Pat. No. 11,501,013, issued Nov. 15, 2022 and titled "Autonomous Machine Learning Methods for Detecting and Thwarting Malicious Database Access," the entire disclosures of each of which are incorporated by reference herein for all purposes.

TECHNICAL FIELD

This disclosure relates generally to data security, and more specifically, to the detection and prevention of ransomware attacks at disk level.

BACKGROUND

Data (particularly sensitive data) is more valuable than ever, for example since an increasing variety of data types are attractive to hackers (e.g., financial data, healthcare data, passwords, etc.). Encryption has emerged as an important tool in securing sensitive data and other assets. Several data protection and privacy standards, such as the General Data Protection Regulation (GDPR), now require encryption of sensitive data.

SUMMARY

In some embodiments, a method includes: receiving, at a processor and from a requestor compute device, a first request that references at least one of an electronic file or a data set stored in a first memory. A plurality of subsequent requests originating from the requestor compute device is monitored via the processor. A backup copy of a subset of the at least one of the electronic file or the data set is caused to be stored in a second memory different from the first memory, and in parallel with the monitoring of the plurality of subsequent requests, in response to the plurality of subsequent requests. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. An alert message that includes an indication of an association between the requestor compute device and the detected ransomware type is generated in response to identifying the detected ransomware type. Or an access control permission associated with the requestor compute device is modified in response to identifying the detected ransomware type.

In some embodiments, a non-transitory, processor-readable medium storing instructions that, when executed by a processor, cause the processor to: receive, from a requestor compute device, a first request that references one of an electronic file or a data set stored in a memory. A plurality of subsequent requests originating from the requestor compute device is monitored. A detected ransomware type from a plurality of ransomware types is identified based on the monitoring of the plurality of subsequent requests. Each ransomware type from the plurality of ransomware types is associated with a predefined sequence of actions associated with the one of the electronic file or the data set. In response to identifying the detected ransomware type, an alert message that includes an indication of an association between the requestor compute device and the detected ransomware type is generated, or an access control permission associated with the requestor compute device is modified.

In some embodiments, a ransomware detection method includes receiving, at a processor and from a requestor compute device, a first request that references one of an electronic file or a data set stored in a first memory. A plurality of subsequent requests originating from the requestor compute device is monitored via the processor. A backup copy of a subset of the one of the electronic file or the data set is caused to be stored in a second memory different from the first memory, and in parallel with the monitoring of the plurality of subsequent requests and in response to the plurality of subsequent requests. The backup copy is encrypted by the processor. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. An access control permission associated with the requestor compute device is modified in response to identifying the detected ransomware type, and denying access to the one of the electronic file or the data set based on the modified access control permission.

In some embodiments, a ransomware detection method includes receiving, at a processor and from a requestor compute device, a first request that references one of an electronic file or a data set stored in a first memory. The first request from the requestor compute device is correlated with a first role. A first set of permissions corresponding to the electronic file or the data set is generated. A plurality of subsequent requests originating from the requestor compute device is monitored via the processor. Each subsequent request is correlated with a subsequent role from a plurality of subsequent roles. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. A subsequent set of permissions corresponding to the subsequent role is generated. The subsequent set of permissions is different from the first set of permissions. An access control permission associated with the requestor compute device is modified in response to identifying the detected ransomware type, and granting or denying access to the one of the electronic file or the data set based on the modified access control permission in conformity with the subsequent set of permissions.

In some embodiments, a ransomware detection method includes receiving, at a processor and from a requestor compute device, a first request that references one of an electronic file or a data set stored in a first memory. A plurality of subsequent requests originating from the requestor compute device is monitored via the processor. A first version of a subset of the one of the electronic file or the data set is caused to be stored in a second memory different from the first memory, and in parallel with the monitoring of the plurality of subsequent requests and in response to the plurality of subsequent requests. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. The actions include updating the first version of electronic file or the data set into a second version of the one of the electronic file or the data set. The second version is different from the first version. An alert message that includes an indication of an association between the requestor compute device and the detected ransomware type is generated in response to identifying the detected ransomware type. The electronic file or the data set is modified to the first version.

BRIEF DESCRIPTION OF THE FIGURES

FIGS. 9A-9B show a tabular/dashboard view of audit events generated by a ransomware detection system, according to some embodiments.

DETAILED DESCRIPTION

Figure 1:
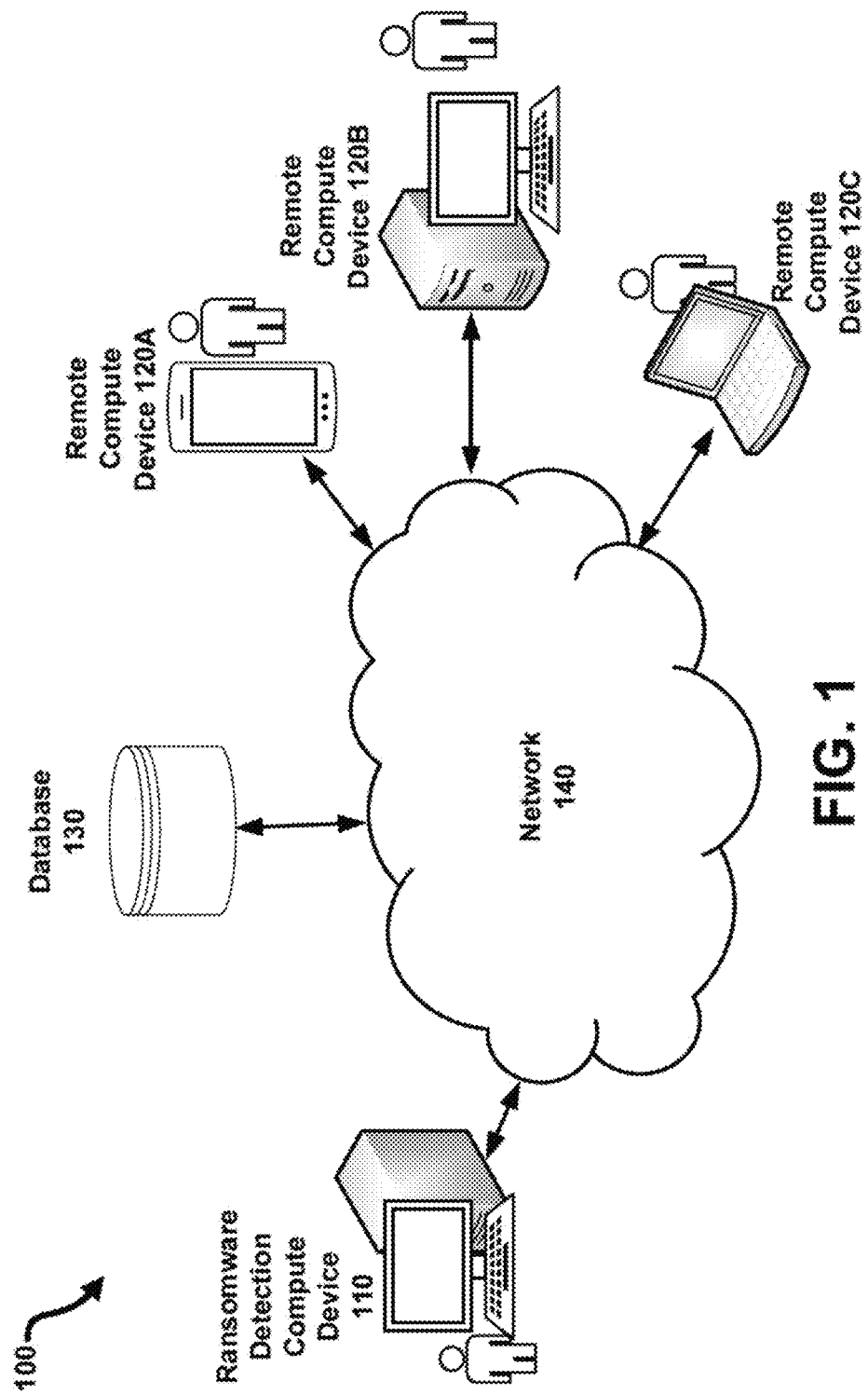
FIG. 1 is a schematic diagram of a networked ransomware detection system, according to some embodiments.

Systems and methods set forth herein facilitate the detection of ransomware attacks from end user's devices, specifically at the disk level by monitoring patterns of requests, in accordance with some embodiments.

Ransomware is a type of malware that blocks access to files and/or encrypts files until victims pay cybercriminals a steep ransom. If the victim doesn't pay, the cybercriminals could leak data contained within the files or continue to block file access. Ransomware can significantly negatively impact both individuals and businesses. The FBI's Internet Crime Complaint Center reported 2,084 ransomware complaints from January to Jul. 31, 2021. This represents a 62% year-over-year increase. According to Business Insider, in 2021, the largest ransomware payout was made by an insurance company for $40 million, setting a world record. The average ransom fee requested has increased from $5,000 in 2018 to around $200,000 in 2020 according to National Security Institute. Ransomware stays hidden in an infected computer until files are blocked or encrypted. Ransomware detection is the identification of the infection earlier in the process, potentially before any damage is done. Ransomware detection involves using a mix of automation and malware analysis to discover malicious files. Currently, a variety of ransomware detection techniques are used to overcome ransomware's stealth and defense evasion functionality. There are at least three known primary ways to detect ransomware: by signature, by behavior and by abnormal traffic, discussed in turn below.

Signature-Based Ransomware Detection:

Malware can carry a unique signature including information such as domain names, IP addresses and other indicators that identify it. Signature-based ransomware detection uses a library of these signatures to compare them to active files running on a machine. This is the most basic method of detecting malware, but it's not always effective. Ransomware attackers can create new versions of malware with new signatures for every attack. Signature-based ransomware detection cannot identify what it doesn't recognize. This leaves systems vulnerable to every new malware variant.

Behavior-Based Ransomware Detection:

Ransomware behaves in an unusual way: it opens dozens of files and replaces them with encrypted versions. Behavior-based ransomware detection can look for specific activities that are known to be malicious or to look for anomalous actions that differ from the norm. This method of detection can also help users stay protected against unknown malwares or new variant of known ransomwares. However behavior-based ransomware detection come at a resource intensive cost. Thus, behavior based ransomware detection often cannot be real-time due to its expensive computational power.

Traffic-Based Ransomware Detection:

Abnormal traffic detection is another commonly used technique for ransomware detection. Sophisticated ransomware steals and exfiltrates sensitive data before encrypting it to provide the attacker with additional leverage when convincing the victim to pay the ransom demand. Carrying out a large-scale data breach requires the ability to send large amounts of data from inside the network to outside systems under the attacker's control. While ransomware can cover its tracks and conceal the transfers, it may create network traffic that can be tracked. Abnormal traffic detection can trace back to the ransomware on the machine so that users can delete it. However this method may lead to intensive memory and high overhead on processing capacity.

Thus there exists a need for ransomware detection system and method that can be effective while using less overhead or computational power than known systems and methods. Unlike known approaches to ransomware detection, embodiments set forth herein can detect and stop potentially harmful ransomware attacks at disk level using a machine learning algorithm. In some embodiments, a ransomware detection system uses an online/streaming machine learning model and one or more application programming interfaces (APIs). The ransomware detection system can be configured to monitor and detect one or more of:

Read Request Rate

Write request rate including overwrite request and new file request

Delete request rate
Rename request rate

One or more ransomware detection embodiments of the present disclosure includes the capability to identify and subvert/stop potentially malicious data access attempts using a machine learning engine. In some embodiments, a request received at the ransomware detection system can be identified as potentially malicious based on an analysis of the current request together with multiple subsequent requests. During "normal" operations (e.g., no malicious activity), requests for reading a file, writing a file, and deleting a file are may occur at a relatively low frequency and/or rate of occurrence, often for individual files at a time. In contrast, ransomware can include reading a plurality of files, overwriting the plurality of files, deleting the plurality of files, and replacing the plurality of files with encrypted versions, optionally in batches and/or at high frequency/ rates of occurrence. Potential ransomware can be detected and/or monitored by monitoring patterns of such requests. For example, in response to detecting that a sequence of requests is received in the following order: read request, new file request (a type of write request), and delete request, this sequence of requests can be categorized or labelled as belonging to a first particular predefined type of ransomware. As another example, in response to detecting that a sequence of requests is received in the following order: read request, followed by overwrite request (a type of write request), this sequence of requests can be categorized or labelled as belonging to a second predefined type of ransomware different from the first predefined type of ransomware. As yet another example, in response to detecting that a sequence of requests is received in the following order: read request, overwrite request (a type of write request), and rename request, this sequence of requests can be categorized or labelled as belonging to a third predefined type of ransomware different from the first and second predefined types of ransomware. In some implementations, one or more metrics associated with ransomware activities (or suspected ransomware activities) are defined, for example as shown in Table 1 below, and tracked by one or more machine learning engines.

TABLE 1

| Metrics to track | Comment |
| --- | --- |
| Read request rate | |
| Write request rate (including overwrite request and new file request) | |
| Delete request rate | |
| Rename request rate | |
| Read + New file + Delete | Type I |
| Read + Overwrite | Type II |
| Read + Overwrite + Rename | Type III |

As seen from Table 1, one or more ransomware types are defined based on the sequential requests or patterns of requests received at the ransomware detection system. Specifically, by way of example, Type I ransomware is defined by a sequence of requests received in the order of read request, new file request (e.g., a request to generate/create a new file), and delete request; Type II ransomware is defined by a sequence of requests received in the order of read request and overwrite request; and. Type III ransomware is defined by a sequence of requests received in the order of read request, overwrite request, and delete request. As ransomware types are defined by Table 1 above, Table 2 below shows what type of actions are performed by different types of ransomware.

TABLE 2

| | Read | Create New File (Write) | Overwrite File (Write) | File Rename | Delete Original file | Encrypt Content |
| --- | --- | --- | --- | --- | --- | --- |
| Type I | Yes | Yes | | | Yes | Yes |
| Type II | Yes | No | Yes | | | Yes |
| Type III | Yes | No | Yes | Yes | | Yes |

As shown in Table 2, in accordance with some embodiments, Type I ransomware is defined as including attempts to read a file, then to create a new file, and to delete the original file. Type II ransomware attempts to read a file, and then overwrites the file. Type III ransomware attempts to read a file, overwrites the file, and then renames the file. All of Type I, Type II, and Type III ransomwares include attempting to encrypt the file. Table 3 below is an example overview of file actions performed by different ransomware types.

TABLE 3

| | Types | Comment |
| --- | --- | --- |
| Requests to Read Files | All Types | All Types have to read file before encryption |
| Requests to Write Files (e.g., including create new file requests and overwrite requests) | All Types | Type I: New file request Type II and Type III: Overwrite request |
| Requests to Delete/Destroy Original File(s) | All Types | Type I: Deletes original file Type II and Type III: Overwrites the original file |

Figure 8:
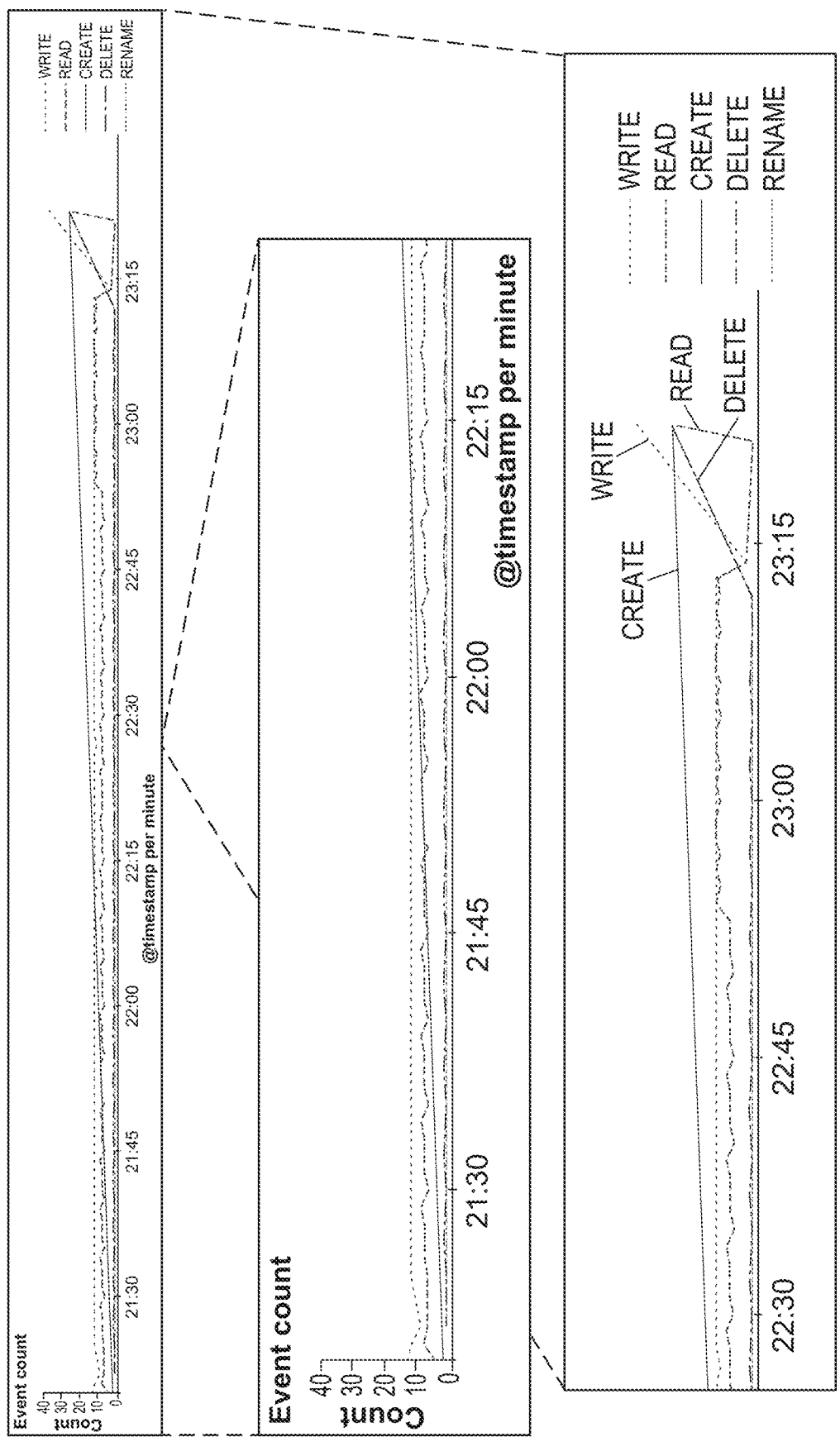
FIG. 8 is a diagram showing activities monitored by a ransomware detection system, according to some embodiments.
Figure 10:
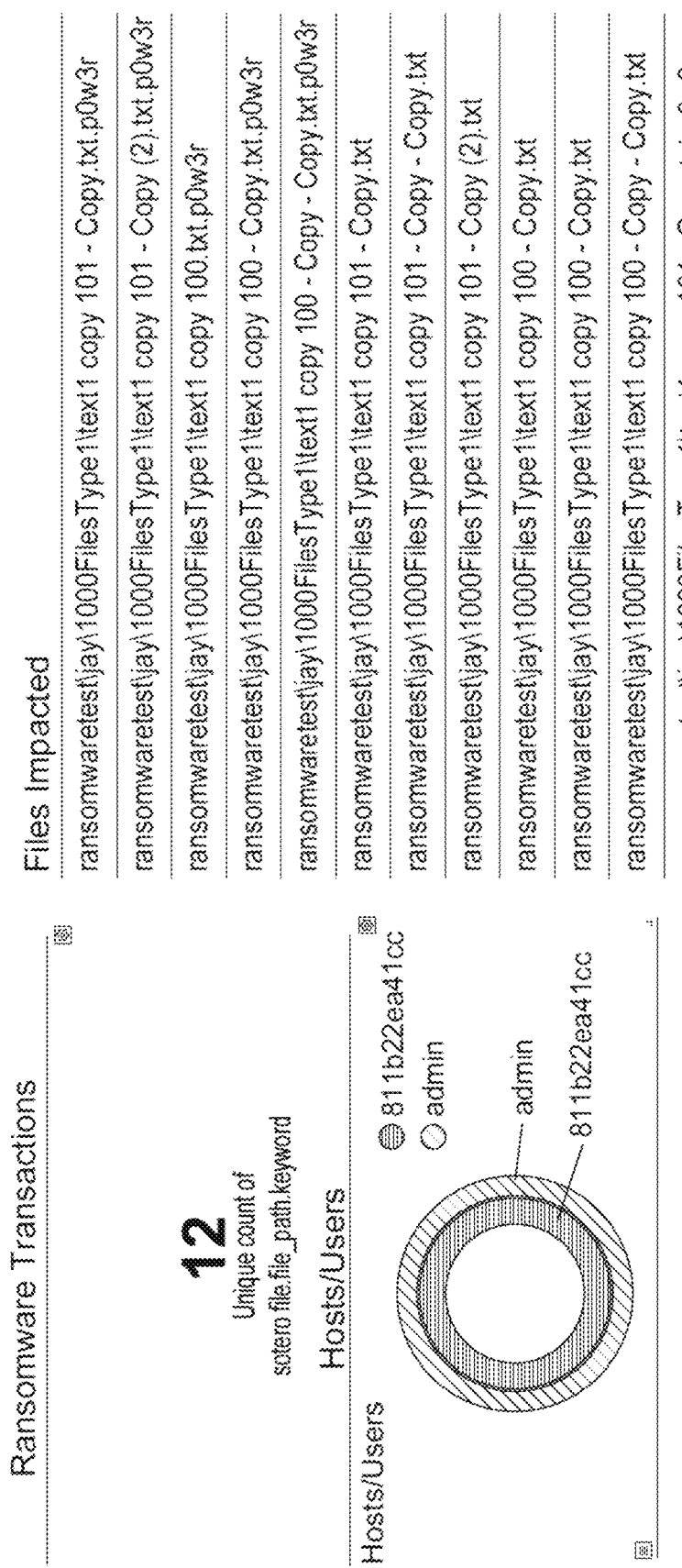
FIG. 10 shows example representations of ransomware transactions detected, host/user relationships, and impacted files, according to some embodiments.

As shown in Table 3, each of Type I, Type II, and Type III ransomware attempts to read a file, write a file, and delete a file. Types II and III include requests to overwrite an original file. In addition, each of Type I, Type II, and Type III ransomware attempts to encrypt a file, as shown and discussed with reference to Table 2 above. One or more ransomware detection embodiments of the present disclosure can identify and stop potentially malicious ransomware using machine learning engine that is trained to monitor metrics associated with the actions shown in Tables 2 and 3, and to detect patterns of requests to detect ransomware from among multiple types (e.g., to identify the ransomware or suspected ransomware as being one or more of the ransomware types defined above). In some embodiments, the requests are logged/recorded by the ransomware detection system and available for view by an administrator, for example as shown in FIG. 8. FIG. 8 is a diagram showing plots of frequencies of occurrence over time of activities monitored by a ransomware detection system. As shown in FIG. 8, activities/requests including write requests, read requests, file creation requests, delete requests (e.g., file deletion requests), and file rename requests are logged and recorded by the ransomware detection system. An administrator can view and monitor the logged activity/request types, time of the requests, counts of the requests, IP address(es) from which the requests originate, etc. FIGS. 9A-9B show a tabular/dashboard view of audit events generated by a ransomware detection system, which may be presented/rendered via a graphical user interface (e.g., of a compute device of an administrator user), according to some embodiments. As shown in FIGS. 9A-9B, audit event data can include date and time information, classification of the type of action (e.g., READ, WRITE, CREATE, DELETE), IP address of an associated remote host, URL of an associated proxy host, one or more associated file paths, file length, ransomware score, anomaly determination (e.g., FALSE or TRUE), type of resource being accessed or requested to be accessed (e.g., file), and associated user identifier(s). FIG. 10 shows example representations of ransomware transactions detected, host/user relationships, and impacted files, according to some embodiments. Such representations may be presented/rendered via a graphical user interface (e.g., of a compute device of an administrator user).

In some embodiments, in addition to monitoring and detecting potential ransomware by monitoring patterns of request, a request received at the ransomware detection system can be identified as potentially malicious based on an analysis of multiple factors associated with the request. The request may include a query. The factors analyzed may include one or more of: an identifier of the user/compute device/network from which the request was received or from which the request originated, a time of submission of the request, a date of submission of the request, a day of submission of the request, a location from which the request was transmitted (e.g., geographic location, internet protocol (IP) address, etc.), a specific data set that the request is attempting to access, a file extension of the data set (or data thereof), a directory of the data set, etc. Any number of different factors or attributes may be used for this purpose, and the types of factors (or "attributes") that are included in a given set of factors or attributes may be predefined, for example by a user (such as a system administrator) and stored in memory. The factors/attributes can include attributes that are part of the request. In some implementations, each attribute from a given set of attributes may be assigned a different associated weight such that the attributes contribute to differing degrees in the determination of maliciousness.

In some embodiments, a ransomware detection engine, implemented in software and/or hardware, using machine learning models trained to monitor metrics of actions and detect patterns of requests, is configured to automatically detect requests and/or analyze the patterns of requests, in real time or substantially in real time, to identify potential ransomware types from the one or more ransomware types.

In some embodiments, the ransomware detection system is configured to detect one of more of the following conditions: SQL overflow, SQL injection, anomalous location, anomalous time of day or date, anomalous volume of data, anomalous frequency of access associated with a particular user, anomalous frequency of access associated with a particular datastore, anomalous frequency of access associated with a particular data set, abnormality in a data set being accessed, anomalous software application(s) or software application behavior(s), newly-identified ransomware (i.e., a ransomware that was not previously defined or known by the ransomware detection system), anomalous device identifier(s), anomalous browser identifier(s), anomalous operation system (OS), and data dump(s). In response to detecting one or more of the foregoing conditions, the ransomware detection system can be configured (e.g., via software) to automatically perform one or more of: generate an alert message, send an alert message, cause an alert message to be displayed, cause details about the requested transaction to be displayed, block the action(s)/transaction(s) from proceeding, generate a decline message, send a decline message to a requestor, generate a hold message, cause the transaction to be held for further analysis, etc. In some implementations, the ransomware detection system includes a "whitelist" or list of approved users, IP addresses, request types, requestor compute devices, etc.

Alternatively or in addition, in some implementations, the ransomware detection system can be configured to detect a ransomware based on an IP address of a requestor, a geo-location of the requestor, a detected "role" (e.g., permissioning) of the requestor, and/or a predefined data transfer limit.

In some embodiments, the ransomware detection system is configured to perform anomaly detection (e.g., malware detection more generally), by logging/recording and monitoring behaviors within a computing system, for example for each requestor from a plurality of requestors, for each requestor compute device from a plurality of compute devices/"endpoints," and/or for one or more application(s) running on the compute device. When the ransomware detection system detects an abnormal behavior or abnormal traffic from one or more requestors, requestor compute devices, or applications running on the compute device(s), the ransomware detection system can flag one or more associated actions as suspicious and block the action(s) in real time. The abnormal behavior or abnormal traffic can include, for example, one of, or any combination of: a requestor or requestor compute device logging in for the first time, a request from a requestor compute device that comes in from or originates from a new IP address not previously associated with the requestor, and requests from a requestor access to files that the requestor had never used before. In such example situations, the ransomware detection system is configured to flag the actions as suspicious and block the actions in real time or otherwise automatically implement remediating actions (such as any remediating actions described herein). Such remediating actions can include further investigation of the anomaly, further investigation of the request(s), quarantining of file(s), automatically changing permissions/access controls, triggering a software update, restoration of one or more files to a previous version thereof (e.g., a copy of which has automatically been saved in advance), automatically backing up one or more files (e.g., referenced by the request(s)), causing display of a prompt to install or update software to combat malware, automatically triggering the installation or updating of anti-malware software, etc.) As such, the ransomware detection system can help users stay protected against unknown malware or new variants of known malware.

In some embodiments, the ransomware detection system is configured to protect files or data in unstructured form. Alternatively, the ransomware detection system can protect files or data in structured form. Structured data is highly organized and formatted so that it's easily searchable in databases. Unstructured data has no predefined format or organization, making it much more difficult to collect, process, and analyze. Examples of structured data include names, dates, addresses, credit card numbers, stock information, geolocation, etc. Examples of unstructured data include text, video files, audio files, mobile activity, social media posts, satellite imagery, surveillance imagery, etc. The ransomware detection system described herein can protect both structured and instructed data and files.

In some embodiments, when a request is received at the ransomware detection system, the ransomware detection system will flag the request as suspicious or unknown until the flag is cleared and marked normal. The ransomware detection system continues to monitor subsequent requests by using the machine learning engine to detect ransomware types. If the ransomware detection system detects that the patterns of requests belong to one of multiple predefined ransomware types, such as those defined in Table 1, Table 2, or Table 3 above, the ransomware detection system may send an alert to the user and block the access request. If the ransomware detection system detects and determines (and/or a user inputs an indication) that the request is not malicious, the access request will be granted and the request is then cleared of its suspicious/unknown flag and marked as normal. In some implementations, when a request is received at the ransomware detection system, the file that the request attempts to access is saved and backed up in a temporary datastore. The generation of the backup copy can occur automatically and/or in response to (i.e., "triggered" by) the receipt and/or categorization of the request. For example, when a write request (e.g., an overwrite request or a create new file request) is received at the ransomware detection system, the system may first back up and save the associated data and/or referenced file in a temporary datastore and flag the request as suspicious or unknown. The machine learning engine then monitors subsequent requests to detect ransomware types. If the ransomware detection system determines that the request is normal, the request is cleared to proceed, the system then removes the flag and grants access of the file to the requestor, and optionally removes the backup file from the temporary datastore. If, on the other hand, the ransomware detection system determines that the request and subsequent requests are/exhibit one of the ransomware types, the ransomware detection system will send an alert to the user, block access to the file by the requestor, and/or take other remediating action (e.g., further investigate the request(s), quarantine file(s), automatically change permissions, trigger a software update, cause display of a prompt to install software to combat the ransomware, etc.).

In some embodiments, a request is sent from one or more requestor end devices. Each requestor, requestor compute device, and/or application on the requestor compute device can have associated predefined and different privileges or "roles" for accessing the file that the request is attempting to use, view, or modify. When a request is cleared and marked normal by the ransomware detection system, access to the file is granted based on the privileges or "role" of the requestor. The privileges or "roles" can be based on the requestor, requestor compute device, application(s) running on the compute device, etc. Examples of predefined privileges or "roles" can include fully approved users/requestors (e.g., system admins), partially approved users/requestors (e.g., requestor with access privilege for only partial data), fully approved and/or partially approved IP addresses of requestor compute devices (e.g., admin compute device's IP address and partial privilege compute device's IP address), fully approved and/or partially approved applications on the requestor compute devices, fully approved and/or partially approved request types, etc. In some implementations, a predefined "role" can specify certain actions that can be performed by the requestor, requestor compute device, and/or software application(s) running on or hosted by the requestor compute device, such as read, write, rename, overwrite, create new, and delete. In some implementations, such "roles" can include high-level roles, such as administrator, owner, reader, or more specific roles, such as individual contributor, security operator, etc. In some implementations, roles can be built in and assigned by the ransomware detection system or customized/defined depending on the specific needs of users. In some implementations, "roles" can be further restricted with regard to certain types of data or files. For example, a requestor may be given full access to one or more files that the requestor created, but only partial access (e.g., read-only access, or access to only a subset of the file or data) to other files not created by the requestor. In another example, an administrator may be given full access to files created by certain requestors or saved in certain locations, while a different administrator may be given full access to files created by different requestors or saved in different locations.

In some embodiments, the ransomware detection system includes an encryption/decryption engine (e.g., including or interfacing with an encryption/decryption API). The encryption/decryption engine is configured to encrypt files when write requests are verified and cleared by the ransomware detection system. The resulting encrypted files can be stored in a database that is either remotely accessible by the ransomware detection system or integrated together with the ransomware detection system. In addition, the encryption/decryption engine can be configured to decrypt files when access requests are cleared and marked normal by the ransomware detection system, for example based on the "role" or the privilege of the requestor, requestor compute device, or application on the requestor compute device. In some implementations, based on the "role" or the privilege of the requestor, requestor compute device, or application on the requestor compute device, the requestor may be granted full access to the file (e.g., the ransomware detection system may decrypt the file in its entirety and send the decrypted file to the requestor compute device), or the requestor may be granted with partial access (e.g., the ransomware detection system may partially or fully decrypt the file and provide the requestor with a subset of data from the file). An example of a networked ransomware detection system, in accordance with some embodiments, is shown and described with reference to FIG. 1.

FIG. 1 is a diagram of a networked ransomware detection system 100, according to some embodiments. As shown in FIG. 1, the ransomware detection system 100 includes a ransomware detection compute device 110. The ransomware detection compute device 110 can communicate with a database 130 and with multiple different remote compute devices (e.g., mobile device/smartphone 120A, desktop computer 120B, and laptop 120C) via a wired or wireless network 140, each of the mobile device/smartphone 120A, desktop computer 120B, and laptop 120C having one or more associated users/requestors. Although as shown in FIG. 1, database 130 is located remotely from the ransomware detection compute device 110, alternatively, the database 130 and ransomware detection compute device 110 can be integrated into a single system or can be located geographically close or local to each other. Detailed components of the ransomware detection system 100, especially the components of ransomware detection compute device 110 are shown in FIG. 2.

Figure 2:
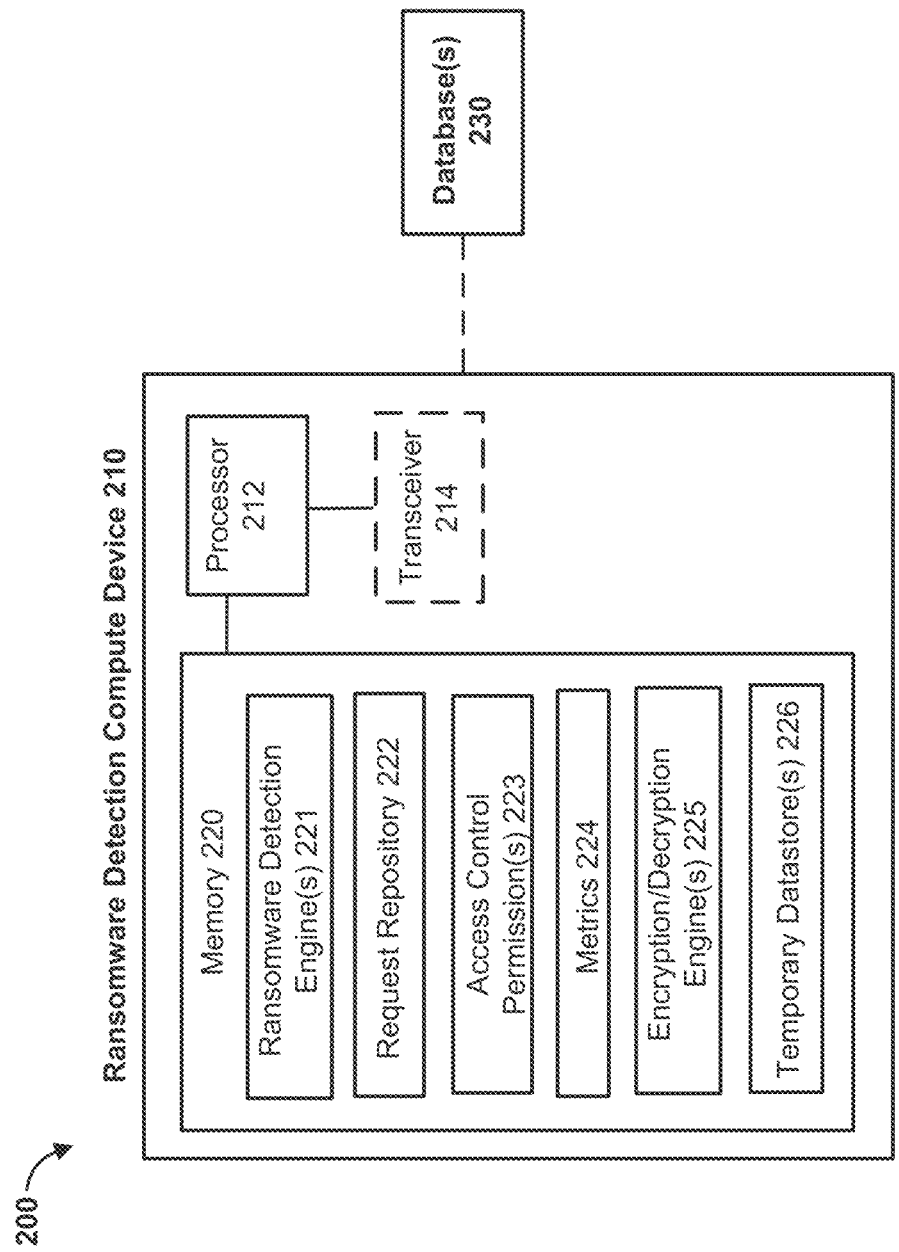
FIG. 2 is a block diagram of an example ransomware detection system, according to some embodiments.

FIG. 2 shows a block diagram of an example ransomware detection system 200, according to some embodiments. As shown in FIG. 2, the ransomware detection compute device 210 includes a processor 212 operably coupled to and in communication with a memory 220 and an optional transceiver 214. The memory 220 includes a ransomware detection engine 221 (e.g., implemented in software, optionally with one or more machine learning models), a request repository 222 (e.g., implemented as a table or database to store initial requests and associated subsequent requests), an access control permission protocol 223 (e.g., specifying what actions a given user, compute device, or system may or may not take with respect to data accessible by the ransomware detection compute device 210, and optionally used as a basis for flagging requests or actions as suspicious and blocking the requests/actions, or for removing suspicious flags and marking requests or actions as normal to grant access of the request or action), metrics 224 (e.g., implemented as a table or database to store types of requests, actions, or ransomware types that are to be tracked by the ransomware detection engine 221), an encryption/decryption engine 225 (e.g., implemented as software and/or hardware and configured to encrypt or decrypt data when access is granted or cleared from suspicious or unknown flags), and a temporary datastore 226 (e.g., a repository for temporarily storing backup files before and until associated requests are cleared from suspicious flags). The ransomware detection system 200 also includes a database 230 which can be located remote from the ransomware detection compute device 210, in which case the data of the remote database 230 may be accessible by the ransomware detection compute device 210 via the transceiver 214 and a communications network (not shown). Alternatively, the database 230 can be integrated with the ransomware detection compute device 210 as a single system without the need for communication through transceiver 214 and/or communication network. Flow diagram for ransomware detection methods are shown in FIG. 3 and FIG. 4.

Figure 3:
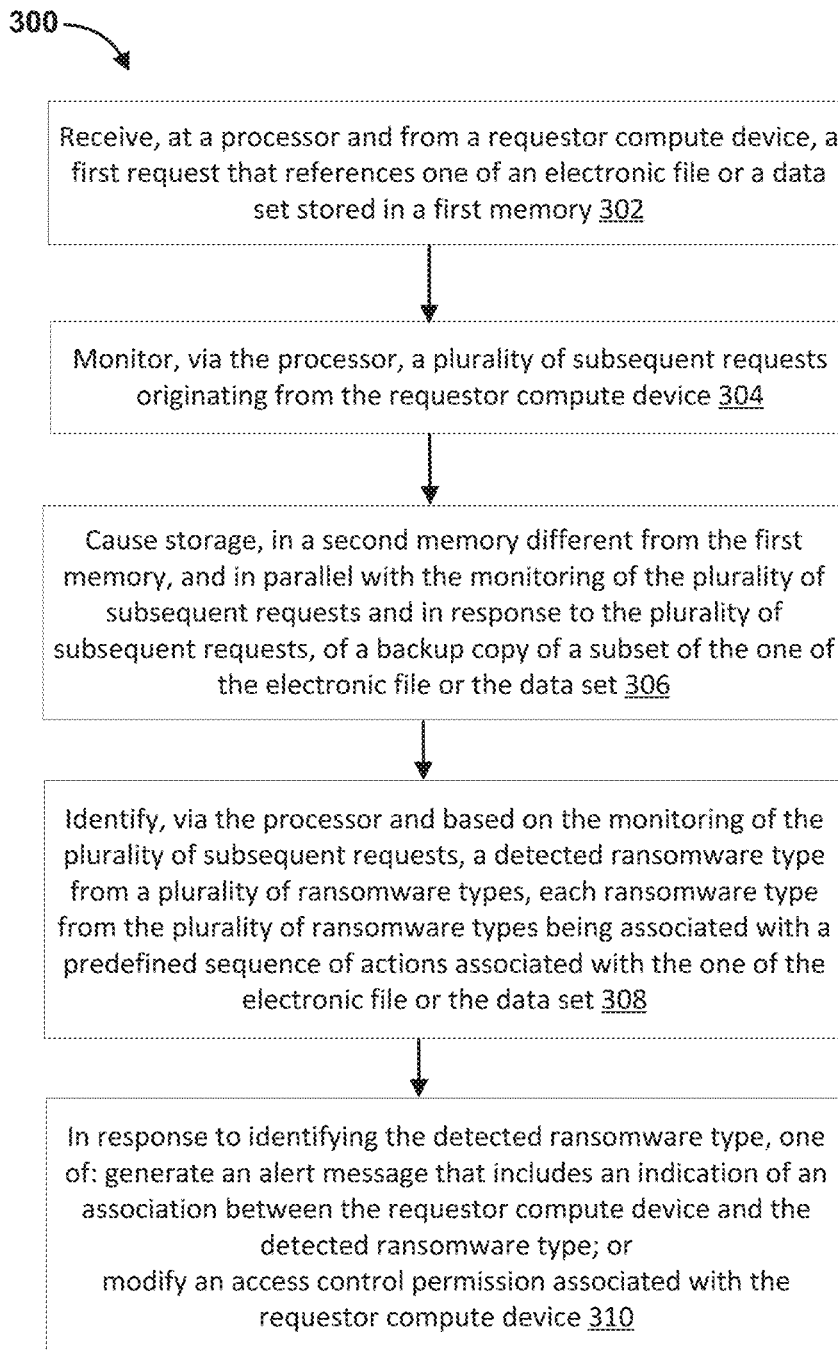
FIG. 3 is a flow diagram of a first ransomware detection method, according to some embodiments.
Figure 4:
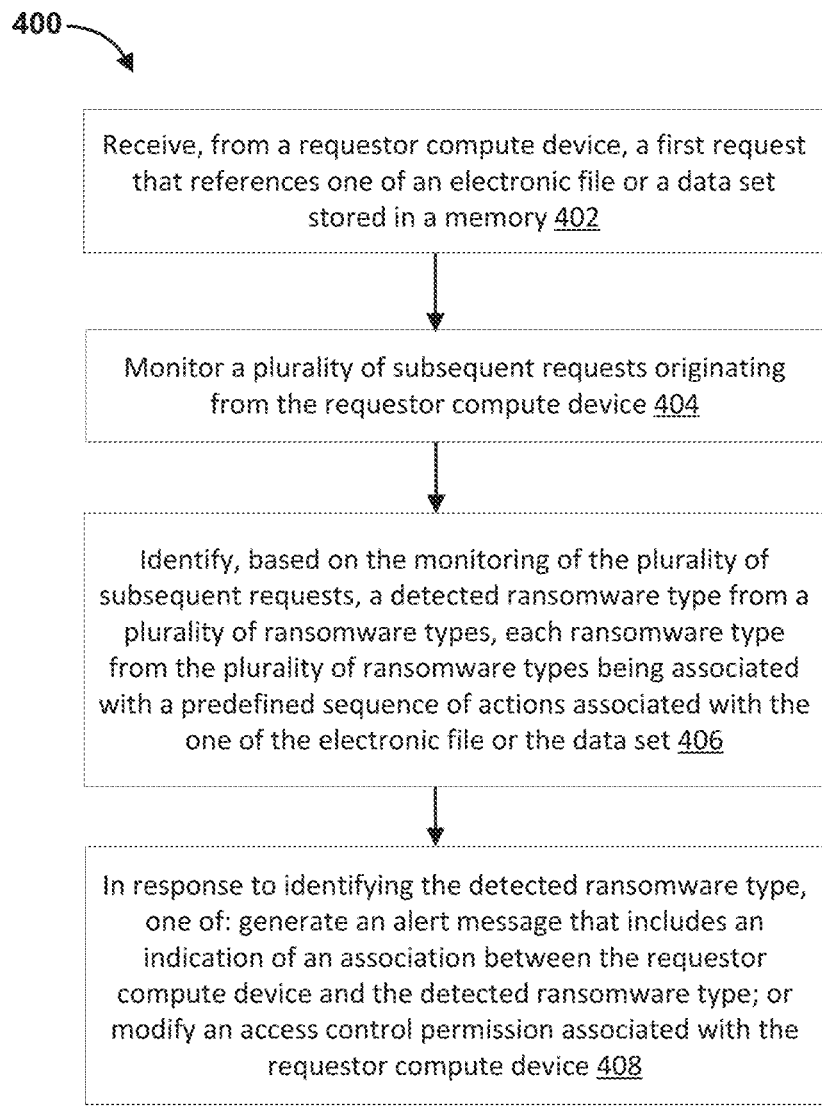
FIG. 4 is a flow diagram of a second ransomware detection method, according to some embodiments.

FIG. 3 is a flow diagram of a first ransomware detection method, according to some embodiments. The method 300 of FIG. 3 can be implemented, for example, using the ransomware detection compute device 210 in FIG. 2.

As shown in FIG. 3, at 302, the method 300 begins with receiving, at a processor (e.g., processor 212 in FIG. 2) and from a requestor compute device (e.g., remote compute device 120A, 120B, or 120C in FIG. 1), a first request that references one of an electronic file or a data set stored in a first memory. The first memory can be a local memory that is located on the requestor compute device where the electronic file or the data set is stored and ready to be uploaded. At 304, the method 300 continues with monitoring, via the processor (e.g., processor 212 in FIG. 2), a plurality of subsequent requests originating from the requestor compute device (e.g., remote compute device 120A, 120B, or 120C in FIG. 1). At 306, the method 300 continues with causing storage, in a second memory (e.g., temporary datastore 226 in FIG. 2, database 130 in FIG. 1, or database 230 in FIG. 2) different from the first memory, and in parallel with the monitoring of the plurality of subsequent requests and in response to the plurality of subsequent requests, of a backup copy of a subset of the one of the electronic file or the data set. In some implementations, the backup copy stored in the second memory (e.g., temporary datastore 226 in FIG. 2, database 130 in FIG. 1, or database 230 in FIG. 2) is encrypted. For example, the electronic file or the data set can be encrypted by an encryption/decryption engine (e.g., encryption/decryption engine 225 in FIG. 2) and stored in the second memory (e.g., temporary datastore 226 in FIG. 2, database 130 in FIG. 1, or database 230 in FIG. 2).

At 308, the method 300 continues with identifying, via the processor (e.g., processor 212 in FIG. 2) and based on the monitoring of the plurality of subsequent requests, a detected ransomware type from a plurality of ransomware types (e.g., ransomware Type I, Type II, or Type III, and saved in metrics 224 in FIG. 2), each ransomware type from the plurality of ransomware types being associated with a predefined sequence of actions (e.g., sequence of actions as defined in Table 1, Table 2, and Table 3, and saved in metrics 224 in FIG. 2) associated with the one of the electronic file or the data set. In some implementations, the predefined sequence of actions associated with the detected ransomware type includes at least one of: a read request, a write request (including overwrite request and new file request), a delete request, or a rename request. In some implementa-tions, the predefined sequence of actions associated with the detected ransomware type includes one of: 1) a read request, a write request (including overwrite request and new file request), and a delete request, 2) a read request and a write request (including overwrite request and new file request), 3) a read request, a rename request, and a write request (including overwrite request and new file request). In some implementations, the identifying the detected ransomware type is based on a rate associated with the plurality of subsequent requests. For example, in Table 1, rate of requests such as read request rate, write request rate, delete request rate, and rename request rate are also monitored to detect ransomware types. In some implementations, the identifying the detected ransomware type is performed using a machine learning algorithm (e.g., performed by a ransomware detection engine such as ransomware detection engine 221 using one or more machine learning algorithms).

At 310, the method 300 continues with, in response to identifying the detected ransomware type (e.g., ransomware Type I, Type II, or Type III as defined in Table 1, Table 2, and Table 3, and saved in metrics 224 in FIG. 2), one of: generating an alert message that includes an indication of an association between the requestor compute device (e.g., remote compute device 120A, 120B, or 120C in FIG. 1) and the detected ransomware type; or modifying an access control permission (e.g., access control permission 223 in FIG. 2) associated with the requestor compute device (e.g., remote compute device 120A, 120B, or 120C in FIG. 1). In some implementations, when a ransomware is identified, the access control permission associated with the requestor compute device is blocked or denied in real time. In some implementations, when there is no ransomware identified, the access control permission associated with the requestor compute device is granted or permitted.

In some embodiments, the method 300 further includes receiving, at the processor (e.g., processor 212 in FIG. 2) and from the requestor compute device (e.g., remote compute device 120A, 120B, or 120C in FIG. 1), an access control request referencing the one of the electronic file or the data set. The method 300 further includes denying access to the one of the electronic file or the data set based on the modified access control permission (e.g., access control permission 223 in FIG. 2). For example, when a ransomware is identified, the access control permission associated with the requestor compute device is blocked or denied.

In some embodiments, the method 300 further includes receiving, at the processor (e.g., processor 212 in FIG. 2) and from the requestor compute device (e.g., remote compute device 120A, 120B, or 120C in FIG. 1), an access control request referencing the one of the electronic file or the data set. The method 300 further includes granting access to the one of the electronic file or the data set based on the modified access control permission (e.g., access control permission 223 in FIG. 2). For example, when there is no ransomware identified, the access control permission associated with the requestor compute device is granted or permitted.

FIG. 4 is a flow diagram of a second ransomware detection method, according to some embodiments. The method 400 of FIG. 4 can be implemented, for example, using the ransomware detection compute device 210 in FIG. 2. As shown in FIG. 4, at 402, the method 400 begins with receiving, from a requestor compute device (e.g., remote compute device 120A, 120B, or 120C in FIG. 1), a first request that references one of an electronic file or a data set stored in a memory (e.g., database 130 in FIG. 1 and database 230 in FIG. 2). At 404, the method 400 continues with monitoring, a plurality of subsequent requests originating from the requestor compute device (e.g., remote compute device 120A, 120B, or 120C in FIG. 1).

At 406, the method 400 continues with identifying, based on the monitoring of the plurality of subsequent requests, a detected ransomware type from a plurality of ransomware types (e.g., ransomware Type I, Type II, or Type III, and saved in metrics 224 in FIG. 2), each ransomware type from the plurality of ransomware types being associated with a predefined sequence of actions (e.g., sequence of actions as defined in Table 1, Table 2, and Table 3, and saved in metrics 224 in FIG. 2) associated with the one of the electronic file or the data set. In some implementations, the predefined sequence of actions associated with the detected ransomware type includes at least one of: a read request, a write request (including overwrite request and new file request), a delete request, or a rename request. In some implementations, the predefined sequence of actions associated with the detected ransomware type includes at least two of: a read request, a write request (including overwrite request and new file request), a delete request, or a rename request. In some implementations, the identifying the detected ransomware type is based on an arrival rate associated with the plurality of subsequent requests. In some implementations, the identifying the detected ransomware type is performed using a machine learning algorithm (e.g., performed by a ransomware detection engine such as ransomware detection engine 221 of FIG. 2 and using one or more machine learning algorithms).

At 408, the method 400 continues with, in response to identifying the detected ransomware type (e.g., ransomware Type I, Type II, or Type III as defined in Table 1, Table 2, and Table 3, and saved in metrics 224 in FIG. 2), one of: generating an alert message that includes an indication of an association between the requestor compute device (e.g., remote compute device 120A, 120B, or 120C in FIG. 1) and the detected ransomware type; or modifying an access control permission (e.g., access control permission 223 in FIG. 2) associated with the requestor compute device (e.g., remote compute device 120A, 120B, or 120C in FIG. 1). In some implementations, when a ransomware is identified, the access control permission associated with the requestor compute device is blocked or denied in real time. In some implementations, when there is no ransomware identified, the access control permission associated with the requestor compute device is granted or permitted.

In some embodiments, the method 400 also includes receiving, at the processor (e.g., processor 212 in FIG. 2) and from the requestor compute device (e.g., remote compute device 120A, 120B, or 120C in FIG. 1), an access control request referencing the one of the electronic file or the data set. The method 400 can also include granting or denying access to the one of the electronic file or the data set based on the modified access control permission (e.g., access control permission 223 in FIG. 2). For example, when a ransomware is identified, the access control permission associated with the requestor compute device is blocked or denied. As another example, when there is no ransomware identified, the access control permission associated with the requestor compute device is granted or permitted.

In some embodiments, at least one of the electronic file or the data set is encrypted. Granting access to the one of the electronic file or the data set includes decrypting the one of the electronic file or the data set. For example, the electronic file or the data set saved in the memory (e.g., database 130 in FIG. 1 and database 230 in FIG. 2) is encrypted by an encryption/decryption engine (e.g., encryption/decryption engine 225 in FIG. 2). When there is no ransomware identified, and the access control permission associated with the requestor compute device is granted, the electronic file or the data set is decrypted by the encryption/decryption engine (e.g., encryption/decryption engine 225 in FIG. 2) to be transferred to the requestor compute device (e.g., remote compute device 120A, 120B, or 120C in FIG. 1).

Figure 5:
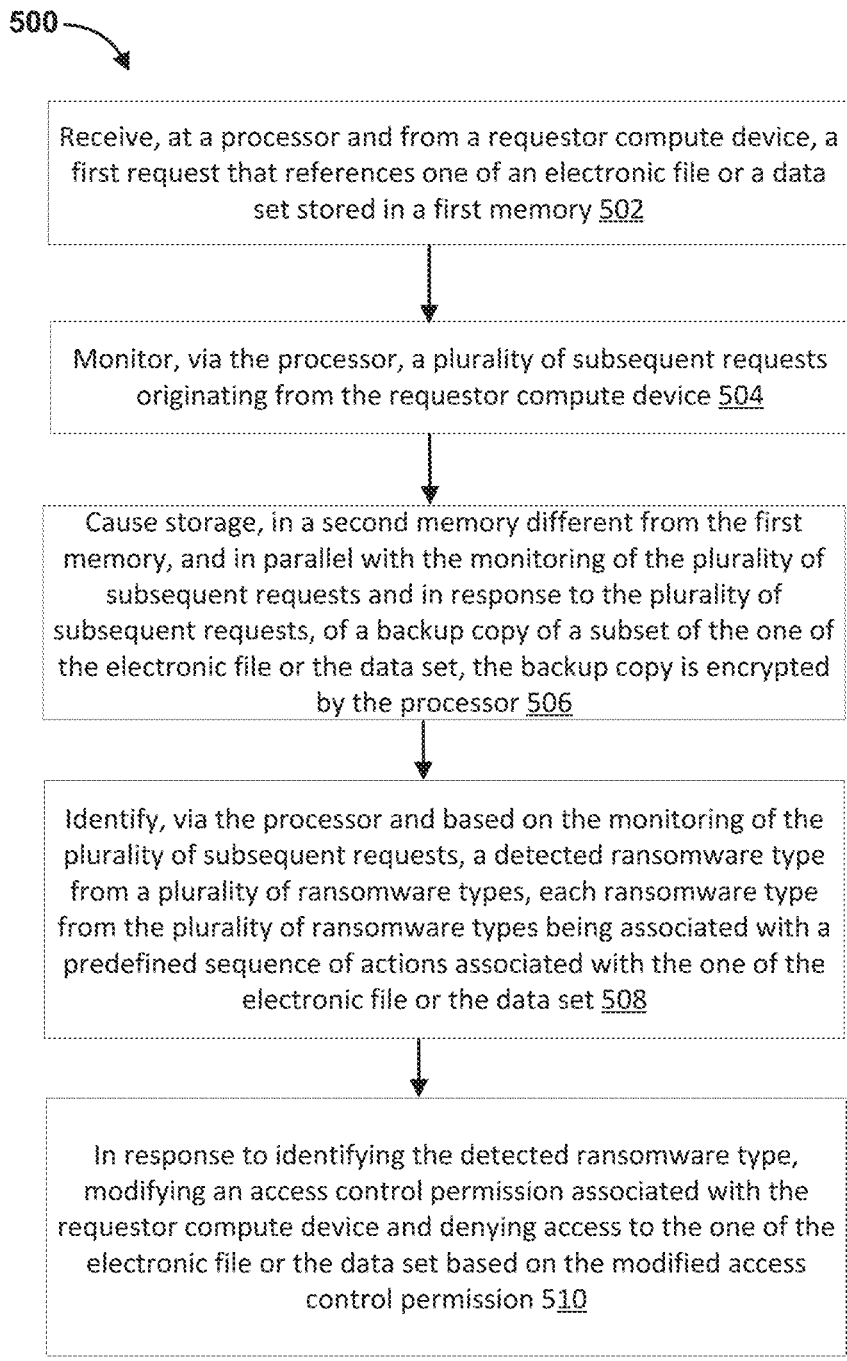
FIG. 5 is a flow diagram of a third ransomware detection method, according to some embodiments.

FIG. 5 is a flow diagram of a third ransomware detection method, according to some embodiments. The method 500 of FIG. 5 can be implemented, for example, using the ransomware detection compute device 210 in FIG. 2.

As shown in FIG. 5, at 502, the method 500 begins with receiving, at a processor (e.g., processor 212 in FIG. 2) and from a requestor compute device (e.g., remote compute device 120A, 120B, or 120C in FIG. 1), a first request that references one of an electronic file or a data set stored in a first memory. The first memory can be a local memory that is located on the requestor compute device where the electronic file or the data set is stored and ready to be uploaded. At 504, the method 500 continues with monitoring, via the processor (e.g., processor 212 in FIG. 2), a plurality of subsequent requests originating from the requestor compute device (e.g., remote compute device 120A, 120B, or 120C in FIG. 1). At 506, the method 500 continues with causing storage, in a second memory (e.g., temporary datastore 226 in FIG. 2, database 130 in FIG. 1, or database 230 in FIG. 2) different from the first memory, and in parallel with the monitoring of the plurality of subsequent requests and in response to the plurality of subsequent requests, of a backup copy of a subset of the one of the electronic file or the data set. In some implementations, the backup copy stored in the second memory (e.g., temporary datastore 226 in FIG. 2, database 130 in FIG. 1, or database 230 in FIG. 2) is encrypted. For example, the electronic file or the data set can be encrypted by an encryption/decryption engine (e.g., encryption/decryption engine 225 in FIG. 2) and stored in the second memory (e.g., temporary datastore 226 in FIG. 2, database 130 in FIG. 1, or database 230 in FIG. 2).

At 508, the method 500 continues with identifying, via the processor (e.g., processor 212 in FIG. 2) and based on the monitoring of the plurality of subsequent requests, a detected ransomware type from a plurality of ransomware types (e.g., ransomware Type I, Type II, or Type III, and saved in metrics 224 in FIG. 2), each ransomware type from the plurality of ransomware types being associated with a predefined sequence of actions (e.g., sequence of actions as defined in Table 1, Table 2, and Table 3, and saved in metrics 224 in FIG. 2) associated with the one of the electronic file or the data set. In some implementations, the predefined sequence of actions associated with the detected ransomware type includes at least one of: a read request, a write request (including overwrite request and new file request), a delete request, or a rename request. In some implementations, the predefined sequence of actions associated with the detected ransomware type includes one of: 1) a read request, a write request (including overwrite request and new file request), and a delete request, 2) a read request and a write request (including overwrite request and new file request), 3) a read request, a rename request, and a write request (including overwrite request and new file request). In some implementations, the identifying the detected ransomware type is based on a rate associated with the plurality of subsequent requests. For example, in Table 1, rate of requests such as read request rate, write request rate, delete request rate, and rename request rate are also monitored to detect ransomware types. In some implementations, the identifying the detected ransomware type is performed using a machine learning algorithm (e.g., performed by an ransomware detection engine such as ransomware detection engine 221 using machine learning algorithm).

At 510, the method 500 continues with, in response to identifying the detected ransomware type (e.g., ransomware Type I, Type II, or Type III as defined in Table 1, Table 2, and Table 3, and saved in metrics 224 in FIG. 2), modifying an access control permission (e.g., access control permission 223 in FIG. 2) associated with the requestor compute device (e.g., remote compute device 120A, 120B, or 120C in FIG. 1) and denying access to the one of the electronic file or the data set based on the modified access control permission. In some implementations, when a ransomware is identified, the access control permission associated with the requestor compute device is blocked or denied in real time. In some implementations, when there is no ransomware identified, the access control permission associated with the requestor compute device is granted or permitted.

Figure 6:
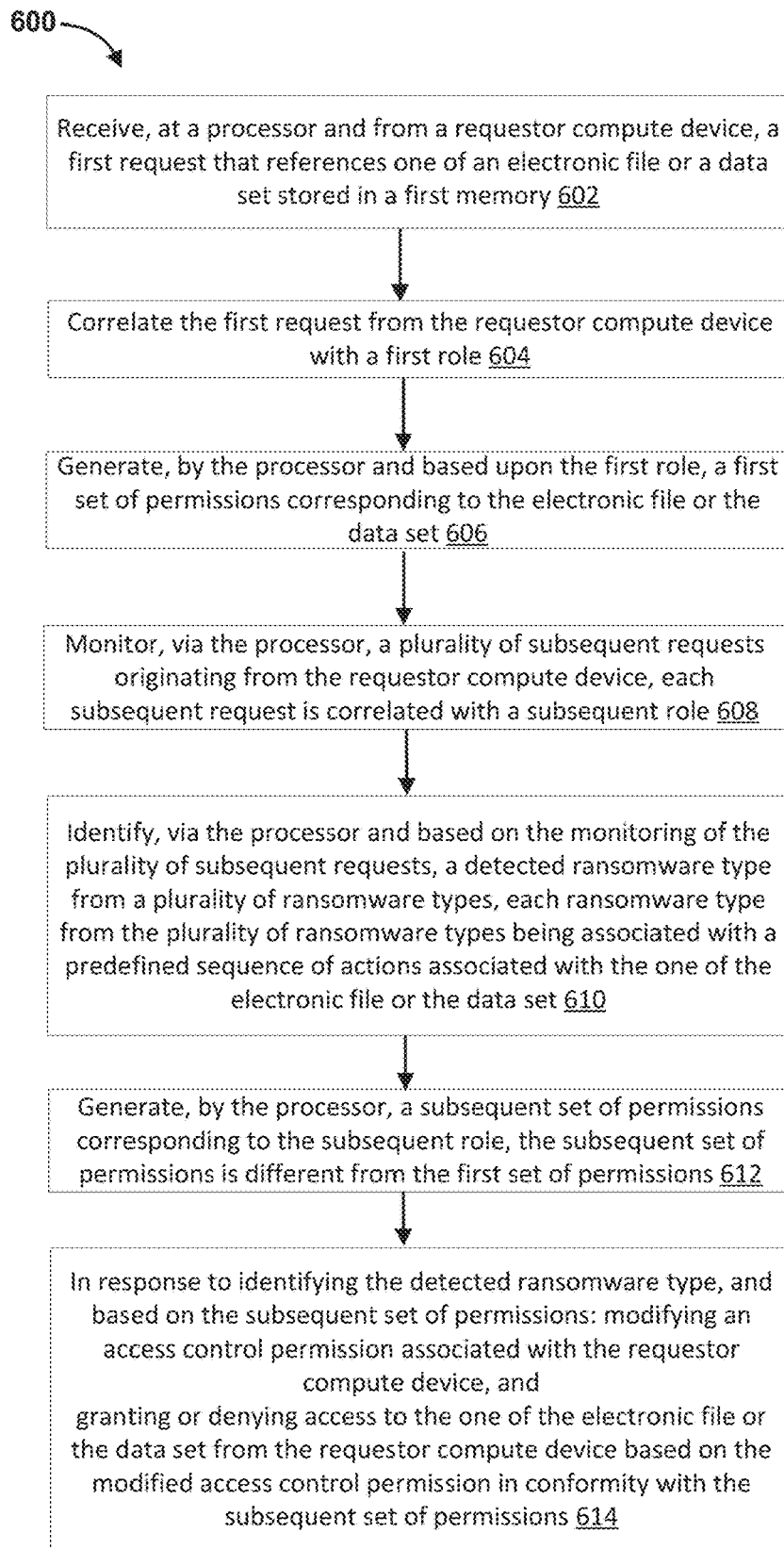
FIG. 6 is a flow diagram of a fourth ransomware detection method, according to some embodiments.

FIG. 6 is a flow diagram of a fourth ransomware detection method, according to some embodiments. The method 600 of FIG. 6 can be implemented, for example, using the ransomware detection compute device 210 in FIG. 2.

As shown in FIG. 6, at 602, the method 600 begins with receiving, at a processor (e.g., processor 212 in FIG. 2) and from a requestor compute device (e.g., remote compute device 120A, 120B, or 120C in FIG. 1), a first request that references one of an electronic file or a data set stored in a first memory. The first memory can be a local memory that is located on the requestor compute device where the electronic file or the data set is stored and ready to be uploaded. At 604, the method 600 continues with correlating the first request from the requestor compute device with a first role. At 606, the method 600 continues with generating, by the processor (e.g., processor 212 in FIG. 2) and based upon the first role, a first set of permissions corresponding to the electronic file or the data set. The first set of permissions is generated based on and in conformity with the first role. For example, if the first role is an administrator with full access for the file or data that the first request requested to access. The first set of permissions is generated to be full access to the requested data or file. At 608, the method 600 continues with monitoring, via the processor (e.g., processor 212 in FIG. 2), a plurality of subsequent requests originating from the requestor compute device (e.g., remote compute device 120A, 120B, or 120C in FIG. 1), each subsequent request is correlated with a subsequent role.

At 610, the method 600 continues with identifying, via the processor (e.g., processor 212 in FIG. 2) and based on the monitoring of the plurality of subsequent requests, a detected ransomware type from a plurality of ransomware types (e.g., ransomware Type I, Type II, or Type III, and saved in metrics 224 in FIG. 2), each ransomware type from the plurality of ransomware types being associated with a predefined sequence of actions (e.g., sequence of actions as defined in Table 1, Table 2, and Table 3, and saved in metrics 224 in FIG. 2) associated with the one of the electronic file or the data set. In some implementations, the predefined sequence of actions associated with the detected ransomware type includes at least one of: a read request, a write request (including overwrite request and new file request), a delete request, or a rename request. In some implementations, the predefined sequence of actions associated with the detected ransomware type includes one of: 1) a read request, a write request (including overwrite request and new file request), and a delete request, 2) a read request and a write request (including overwrite request and new file request), 3) a read request, a rename request, and a write request (including overwrite request and new file request). In some implementations, the identifying the detected ransomware type is based on a rate associated with the plurality of subsequent requests. For example, in Table 1, rate of requests such as read request rate, write request rate, delete request rate, and rename request rate are also monitored to detect ransomware types. In some implementations, the identifying the detected ransomware type is performed using a machine learning algorithm (e.g., performed by an ransomware detection engine such as ransomware detection engine 221 using machine learning algorithm). At 612, the method 600 continues with generating, by the processor (e.g., processor 212 in FIG. 2), a subsequent set of permissions corresponding to the subsequent role, the subsequent set of permissions is different from the first set of permissions.

At 614, the method 600 continues with, in response to identifying the detected ransomware type (e.g., ransomware Type I, Type II, or Type III as defined in Table 1, Table 2, and Table 3, and saved in metrics 224 in FIG. 2), and based on the subsequent set of permissions: modifying an access control permission (e.g., access control permission 223 in FIG. 2) associated with the requestor compute device (e.g., remote compute device 120A, 120B, or 120C in FIG. 1) and granting or denying access to the one of the electronic file or the data set based on the modified access control permission in conformity with the subsequent set of permissions. In some implementations, when a ransomware is identified, the access control permission associated with the requestor compute device is blocked or denied in real time. In some implementations, when there is no ransomware identified, the access control permission associated with the requestor compute device is granted or permitted in conformity with the subsequent set of permissions. For example, when no ransomware is detected, the requestor compute device is cleared and access is granted. When the requestor compute device subsequent request is correlated with a role of administrator, the subsequent access control permission can be a full access to the data or file. The ransomware detection system can provide full access to a completely decrypted version of the data or file that the requestor compute device is requesting access to. When the requestor compute device subsequent request is correlated with a role of reader, the subsequent access control permission can be a partial access to the data or file. The ransomware detection system can provide partial access to the data or file by providing a subset of the decrypted data or file that the requestor compute device is requesting access to.

Figure 7:
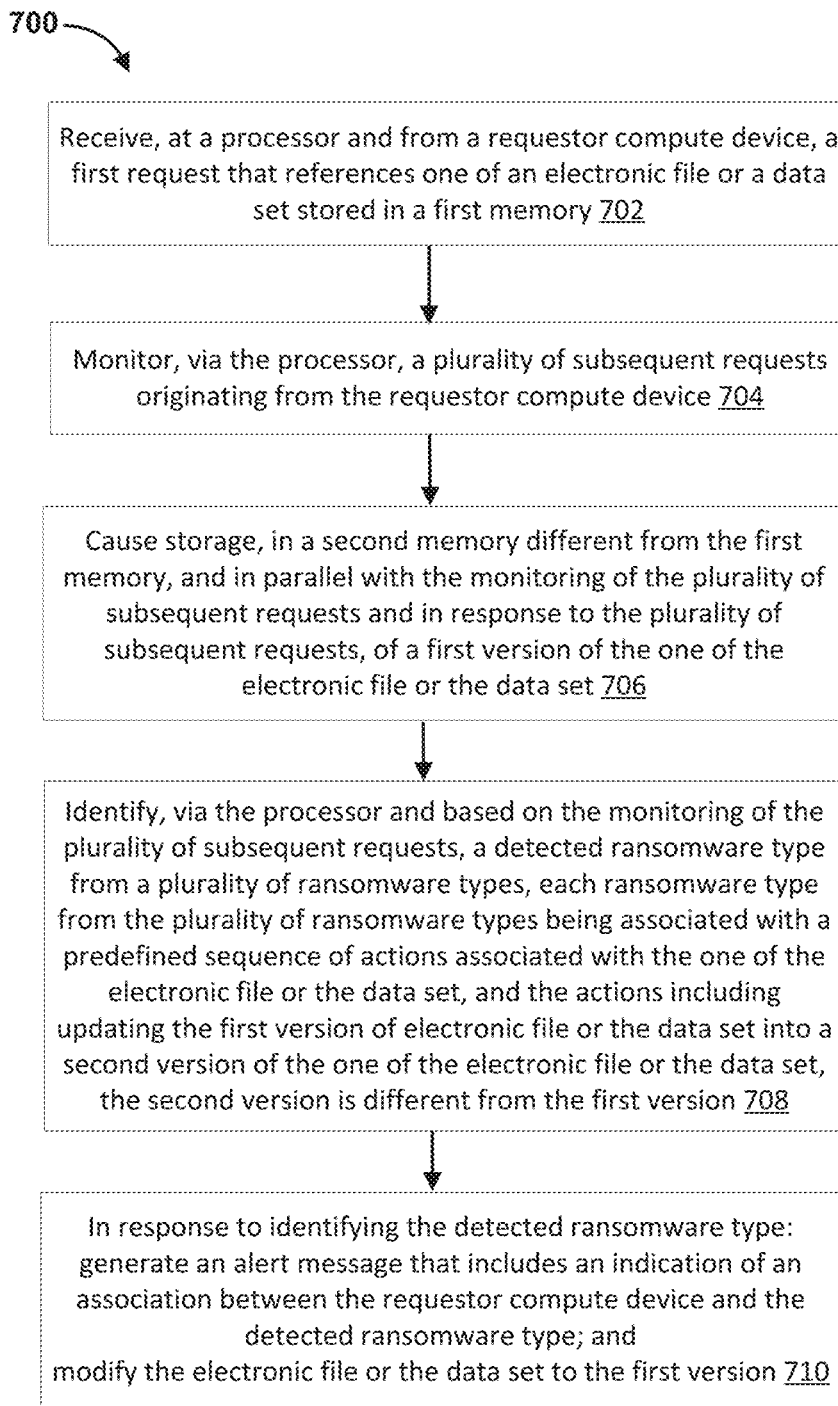
FIG. 7 is a flow diagram of a fifth ransomware detection method, according to some embodiments.

FIG. 7 is a flow diagram of a fifth ransomware detection method, according to some embodiments. The method 700 of FIG. 7 can be implemented, for example, using the ransomware detection compute device 210 in FIG. 2.

As shown in FIG. 7, at 702, the method 700 begins with receiving, at a processor (e.g., processor 212 in FIG. 2) and from a requestor compute device (e.g., remote compute device 120A, 120B, or 120C in FIG. 1), a first request that references one of an electronic file or a data set stored in a first memory. The first memory can be a local memory that is located on the requestor compute device where the electronic file or the data set is stored and ready to be uploaded. At 704, the method 700 continues with monitoring, via the processor (e.g., processor 212 in FIG. 2), a plurality of subsequent requests originating from the requestor compute device (e.g., remote compute device 120A, 120B, or 120C in FIG. 1). At 706, the method 700 continues with causing storage, in a second memory (e.g., temporary datastore 226 in FIG. 2, database 130 in FIG. 1, or database 230 in FIG. 2) different from the first memory, and in parallel with the monitoring of the plurality of subsequent requests and in response to the plurality of subsequent requests, of a first version of the one of the electronic file or the data set. In some implementations, the first version stored in the second memory (e.g., temporary datastore 226 in FIG. 2, database 130 in FIG. 1, or database 230 in FIG. 2) is encrypted. For example, the electronic file or the data set can be encrypted by an encryption/decryption engine (e.g., encryption/decryption engine 225 in FIG. 2) and stored in the second memory (e.g., temporary datastore 226 in FIG. 2, database 130 in FIG. 1, or database 230 in FIG. 2).

At 708, the method 700 continues with identifying, via the processor (e.g., processor 212 in FIG. 2) and based on the monitoring of the plurality of subsequent requests, a detected ransomware type from a plurality of ransomware types (e.g., ransomware Type I, Type II, or Type III, and saved in metrics 224 in FIG. 2), each ransomware type from the plurality of ransomware types being associated with a predefined sequence of actions (e.g., sequence of actions as defined in Table 1, Table 2, and Table 3, and saved in metrics 224 in FIG. 2) associated with the one of the electronic file or the data set. In some embodiments, the actions include updating the first version of electronic file or the data set into a second version of the one of the electronic file or the data set. The second version is different from the first version. In some implementations, the predefined sequence of actions associated with the detected ransomware type includes at least one of: a read request, a write request (including overwrite request and new file request), a delete request, or a rename request. In some implementations, the predefined sequence of actions associated with the detected ransomware type includes one of: 1) a read request, a write request (including overwrite request and new file request), and a delete request, 2) a read request and a write request (including overwrite request and new file request), 3) a read request, a rename request, and a write request (including overwrite request and new file request). In some implementations, the identifying the detected ransomware type is based on a rate associated with the plurality of subsequent requests. For example, in Table 1, rate of requests such as read request rate, write request rate, delete request rate, and rename request rate are also monitored to detect ransomware types. In some implementations, the identifying the detected ransomware type is performed using a machine learning algorithm (e.g., performed by an ransomware detection engine such as ransomware detection engine 221 using machine learning algorithm).

At 710, the method 700 continues with, in response to identifying the detected ransomware type (e.g., ransomware Type I, Type II, or Type III as defined in Table 1, Table 2, and Table 3, and saved in metrics 224 in FIG. 2): generating an alert message that includes an indication of an association between the requestor compute device (e.g., remote compute device 120A, 120B, or 120C in FIG. 1) and the detected ransomware type; and modifying the electronic file or the data set to the first version. In some implementations, when a ransomware is identified, the access control permission associated with the requestor compute device is blocked or denied in real time and the data or file is rolled back to the first version (e.g., uncompromised version). In some implementations, when there is no ransomware identified, the access control permission associated with the requestor compute device is granted or permitted.

In some embodiments, a ransomware detection method includes receiving, at a processor and from a requestor compute device, a first request that references one of an electronic file or a data set stored in a first memory. A plurality of subsequent requests originating from the requestor compute device is monitored via the processor. A backup copy of a subset of the one of the electronic file or the data set is caused to be stored in a second memory different from the first memory, and in parallel with the monitoring of the plurality of subsequent requests and in response to the plurality of subsequent requests. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. An alert message that includes an indication of an association between the requestor compute device and the detected ransomware type is generated in response to identifying the detected ransomware type. Or an access control permission associated with the requestor compute device is modified in response to identifying the detected ransomware type.

In some embodiments, the predefined sequence of actions associated with the detected ransomware type includes at least one of: a read request, a write request, a delete request, or a rename request.

In some embodiments, the predefined sequence of actions associated with the detected ransomware type includes one of: 1) a read request, a write request, and a delete request, 2) a read request and a write request, 3) a read request, a rename request, and a write request.

In some embodiments, the identifying the detected ransomware type is based on a rate associated with the plurality of subsequent requests.

In some embodiments, the method 400 further includes: receiving, at the processor and from the requestor compute device, an access control request referencing the one of the electronic file or the data set. The method 400 includes denying access to the one of the electronic file or the data set based on the modified access control permission.

In some embodiments, the method 400 further includes: receiving, at the processor and from the requestor compute device, an access control request referencing the one of the electronic file or the data set. The method 400 includes granting access to the one of the electronic file or the data set based on the modified access control permission.

In some embodiments, the backup copy is encrypted.

In some embodiments, the identifying the detected ransomware type is performed using a machine learning algorithm.

In some embodiments, a non-transitory, processor-readable medium storing instructions that, when executed by a processor, cause the processor to: receive, from a requestor compute device, a first request that references one of an electronic file or a data set stored in a memory. A plurality of subsequent requests originating from the requestor compute device is monitored. A detected ransomware type from a plurality of ransomware types is identified based on the monitoring of the plurality of subsequent requests. Each ransomware type from the plurality of ransomware types is associated with a predefined sequence of actions associated with the one of the electronic file or the data set. In response to identifying the detected ransomware type, an alert message that includes an indication of an association between the requestor compute device and the detected ransomware type is generated, or an access control permission associated with the requestor compute device is modified.

In some embodiments, the predefined sequence of actions associated with the detected ransomware type includes at least one of: a read request, a write request, a delete request, or a rename request.

In some embodiments, the predefined sequence of actions associated with the detected ransomware type includes at least two of: a read request, a write request, a delete request, or a rename request.

In some embodiments, the instructions to cause the processor to identify the detected ransomware type include instructions to identify the detected ransomware type based on an arrival rate associated with the plurality of subsequent requests.

In some embodiments, the non-transitory, processor-readable medium further storing instructions that, when executed by a processor, cause the processor to: receive, from the requestor compute device, an access control request referencing the one of the electronic file or the data set. The processor either grant or deny access to the one of the electronic file or the data set based on the modified access control permission.

In some embodiments, at least one of the electronic file or the data set is encrypted, and the instructions to grant access to the one of the electronic file or the data set include instructions to decrypt the one of the electronic file or the data set.

In some embodiments, the instructions to identify the detected ransomware type include instructions to identify the detected ransomware type using at least one machine learning algorithm.

In some embodiments, a ransomware detection method includes receiving, at a processor and from a requestor compute device, a first request that references one of an electronic file or a data set stored in a first memory. A plurality of subsequent requests originating from the requestor compute device is monitored via the processor. A backup copy of a subset of the one of the electronic file or the data set is caused to be stored in a second memory different from the first memory, and in parallel with the monitoring of the plurality of subsequent requests and in response to the plurality of subsequent requests. The backup copy is encrypted by the processor. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. An access control permission associated with the requestor compute device is modified in response to identifying the detected ransomware type, and denying access to the one of the electronic file or the data set based on the modified access control permission.

In some embodiments, a ransomware detection method includes receiving, at a processor and from a requestor compute device, a first request that references one of an electronic file or a data set stored in a first memory. The first request from the requestor compute device is correlated with a first role. A first set of permissions corresponding to the electronic file or the data set is generated. A plurality of subsequent requests originating from the requestor compute device is monitored via the processor. Each subsequent request is correlated with a subsequent role. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. A subsequent set of permissions corresponding to the subsequent role is generated. The subsequent set of permissions is different from the first set of permissions. An access control permission associated with the requestor compute device is modified in response to identifying the detected ransomware type, and granting or denying access to the one of the electronic file or the data set based on the modified access control permission in conformity with the subsequent set of permissions.

In some embodiments, a ransomware detection method includes receiving, at a processor and from a requestor compute device, a first request that references one of an electronic file or a data set stored in a first memory. A plurality of subsequent requests originating from the requestor compute device is monitored via the processor. A first version of a subset of the one of the electronic file or the data set is caused to be stored in a second memory different from the first memory, and in parallel with the monitoring of the plurality of subsequent requests and in response to the plurality of subsequent requests. A detected ransomware type from a plurality of ransomware types is identified via the processor and based on the monitoring of the plurality of subsequent requests. Each ransomware type from the plurality of ransomware types is associated with a predefined sequence of actions associated with the one of the electronic file or the data set. The actions include updating the first version of electronic file or the data set into a second version of the one of the electronic file or the data set. The second version is different from the first version. An alert message that includes an indication of an association between the requestor compute device and the detected ransomware type is generated in response to identifying the detected ransomware type. The electronic file or the data set is modified to the first version.

Although some embodiments are described herein as pertaining to ransomware, systems and methods of the present disclosure can likewise be used for other types of malware and/or anomaly detection. Ransomware systems of the present disclosure can be implemented, for example, at one or more file servers or in communication with one or more file servers. Ransomware systems of the present disclosure can serve as a gateway that intercepts traffic between "end devices" (e.g., compute devices at endpoints of a networked computing system) sending requests to one another, and can (e.g., automatically) classify observed activity as normal or anomalous. Ransomware systems of the present disclosure can perform file encryption whenever a file is created and/or updated, and can store the encrypted file in a file vault or other secure repository. In some instances, user privileges may be verified by the ransomware system in response to a file being accessed or attempted to be accessed. If a given user is verified or determined to have applicable access privileges, the file(s) may be decrypted (e.g., by the ransomware system or otherwise).

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Program-mable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements), etc.

The invention claimed is:

1. A non-transitory, processor-readable medium storing instructions that, when executed by a processor, cause the processor to:
   receive, from a requestor compute device, a first request that references one of an electronic file or a data set stored in a first memory;
   monitor a plurality of subsequent requests originating from the requestor compute device, each subsequent request from the plurality of subsequent requests having an associated role from a plurality of roles;
   identify, based on the monitoring of the plurality of subsequent requests, a detected ransomware type from a plurality of ransomware types, each ransomware type from the plurality of ransomware types being associated with a predefined sequence of actions associated with the one of the electronic file or the data set;
   generate a set of permissions for roles from the plurality of roles that are associated with the plurality of subsequent requests; and
   in response to identifying the detected ransomware type, and based on the set of permissions, modify an access control permission associated with the requestor compute device to define a modified access control permission.

2. The non-transitory, processor-readable medium of claim 1, wherein the predefined sequence of actions associated with the detected ransomware type includes at least one of: a read request, a write request, a delete request, or a rename request.

3. The non-transitory, processor-readable medium of claim 1, wherein the predefined sequence of actions associated with the detected ransomware type includes one of: 1) a read request, a write request, and a delete request, 2) a read request and a write request, 3) a read request, a rename request, and a write request.

4. The non-transitory, processor-readable medium of claim 1, wherein the instructions to identify the detected ransomware type include instructions to identify the detected ransomware type based on a rate associated with the plurality of subsequent requests.

5. The non-transitory, processor-readable medium of claim 1, further storing instructions that, when executed by a processor, cause the processor to:
receive, from the requestor compute device, an access control request referencing the one of the electronic file or the data set; and
deny access to the one of the electronic file or the data set based on the modified access control permission.

6. The non-transitory, processor-readable medium of claim 1, further storing instructions that, when executed by a processor, cause the processor to:
receive, from the requestor compute device, an access control request referencing the one of the electronic file or the data set; and
grant access to the one of the electronic file or the data set based on the modified access control permission.

7. The non-transitory, processor-readable medium of claim 1, further including instructions that, when executed by the processor, cause the processor to:
cause storage, in a second memory different from the first memory, and in parallel with the monitoring of the plurality of subsequent requests and in response to the plurality of subsequent requests, of an encrypted backup copy of a subset of the one of the electronic file or the data set.

8. The non-transitory, processor-readable medium of claim 1, wherein the instructions to identify the detected ransomware type include instructions to identify the detected ransomware type using a machine learning algorithm.

9. A method, comprising:
receiving, at a processor and from a requestor compute device, a first request that references one of an electronic file or a data set stored in a memory;
monitoring, via the processor, a plurality of subsequent requests originating from the requestor compute device, each subsequent request from the plurality of subsequent requests having an associated role from a plurality of roles;
identifying, via the processor and based on the monitoring of the plurality of subsequent requests, a detected ransomware type from a plurality of ransomware types, each ransomware type from the plurality of ransomware types being associated with a predefined sequence of actions associated with the one of the electronic file or the data set;
generating, via the processor, a set of permissions for roles from the plurality of roles that are associated with the plurality of subsequent requests; and
in response to identifying the detected ransomware type, and based on the set of permissions, modifying an access control permission associated with the requestor compute device to define a modified access control permission.

10. The method of claim 9, wherein the predefined sequence of actions associated with the detected ransomware type includes one of: a read request, a write request, a delete request, or a rename request.

11. The method of claim 9, wherein the predefined sequence of actions associated with the detected ransomware type includes at least two of: a read request, a write request, a delete request, or a rename request.

12. The method of claim 9, wherein the identifying the detected ransomware type is based on an arrival rate associated with the plurality of subsequent requests.

13. The method of claim 9, further comprising:
receiving, from the requestor compute device, an access control request referencing the one of the electronic file or the data set; and
one of granting access or denying access to the one of the electronic file or the data set based on the modified access control permission.

14. The method of claim 13, comprising granting access to the one of the electronic file or the data set based on the modified access control permission, wherein at least one of the electronic file or the data set is encrypted, and the granting access to the one of the electronic file or the data set includes decrypting the one of the electronic file or the data set.

15. The method of claim 9, wherein identifying the detected ransomware type includes using at least one machine learning algorithm.

16. A non-transitory, processor-readable medium storing instructions that, when executed by a processor, cause the processor to:
receive, from a requestor compute device, a first request that references one of an electronic file or a data set stored in a first memory;
monitor a plurality of subsequent requests originating from the requestor compute device, each subsequent request from the plurality of subsequent requests having an associated role from a plurality of roles;
identify, based on the monitoring of the plurality of subsequent requests, a detected ransomware type from a plurality of ransomware types, each ransomware type from the plurality of ransomware types being associated with a predefined sequence of actions from a plurality of predefined sequences of actions, each predefined sequence of actions from the plurality of predefined sequences of actions associated with the one of the electronic file or the data set;
generate a set of permissions for roles from the plurality of roles that are associated with the plurality of subsequent requests; and
in response to identifying the detected ransomware type, and based on the set of permissions, modify an access control permission associated with the requestor compute device and denying access to the one of the electronic file or the data set based on the modified access control permission.

17. The non-transitory, processor-readable medium of claim 16, wherein each predefined sequence of actions from the plurality of predefined sequences of actions includes at least one of: a read request, a write request, a delete request, or a rename request.

18. The non-transitory, processor-readable medium of claim 16, wherein each predefined sequence of actions from the plurality of predefined sequences of actions includes one of: 1) a read request, a write request, and a delete request, 2) a read request and a write request, or 3) a read request, a rename request, and a write request.

19. The non-transitory, processor-readable medium of claim 16, wherein the instructions to cause the processor to identify the detected ransomware type include instructions to cause the processor to identify the detected ransomware type based on a rate associated with the plurality of subsequent requests.

20. The non-transitory, processor-readable medium of claim 16, wherein the instructions to identify the detected ransomware type include instructions to identify the detected ransomware type using at least one machine learning algorithm.

\* \* \* \* \*